US012732985B2

(12) United States Patent
Mu et al.

(10) Patent No.: US 12,732,985 B2
(45) Date of Patent: Sep. 8, 2026

(54) DATA PROCESSING METHOD AND APPARATUS, COMMUNICATION DEVICE, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Qin Mu, Beijing (CN); Wei Hong, Beijing (CN); Zhongyuan Zhao, Beijing (CN); Yifan Cai, Beijing (CN); Kexin Xiong, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 404 days.

(21) Appl. No.: 18/252,499

(22) PCT Filed: Nov. 11, 2020

(86) PCT No.: PCT/CN2020/128152
§ 371 (c)(1),
(2) Date: May 10, 2023

(87) PCT Pub. No.: WO2022/099512
PCT Pub. Date: May 19, 2022

(65) Prior Publication Data

US 2024/0023082 A1 Jan. 18, 2024

(51) Int. Cl.
*H04W 72/12* (2023.01)
*G06N 3/098* (2023.01)
(Continued)

(52) U.S. Cl.
CPC ............ *H04W 72/12* (2013.01); *G06N 3/098* (2023.01); *G06N 20/00* (2019.01); *H04W 88/00* (2013.01)

(58) Field of Classification Search
CPC ...... H04W 72/12; H04W 88/00; G06N 20/00; G06N 3/098
See application file for complete search history.

(56) References Cited

U.S. PATENT DOCUMENTS

2015/0193695 A1* 7/2015 Cruz Mota ............ G06N 20/00 706/12
2019/0132708 A1 5/2019 Farouk et al.
(Continued)

FOREIGN PATENT DOCUMENTS

CN 110598870 A 12/2019
CN 110929880 A 3/2020
(Continued)

OTHER PUBLICATIONS

International Search Report issued Aug. 2, 2021 in PCT/CN2020/128152 filed on Nov. 11, 2020, 2 pages.
(Continued)

*Primary Examiner* — Noel R Beharry
*Assistant Examiner* — Phillip J Kearns
(74) *Attorney, Agent, or Firm* — Oblon, McClelland, Maier & Neustadt, L.L.P.

(57) ABSTRACT

A data processing method includes determining, by a base station, a distribution characteristic of a local dataset of at least one user equipment (UE), and scheduling, by the base station, based on the distribution characteristic of the local dataset, a target UE from the at least one UE for participating in federated learning.

18 Claims, 11 Drawing Sheets

(51) Int. Cl.
*G06N 20/00* (2019.01)
*H04W 88/00* (2009.01)

(56) References Cited

U.S. PATENT DOCUMENTS

| | | | | |
|---|---|---|---|---|
| 2020/0027019 | A1 | 1/2020 | Yang et al. | |
| 2022/0060390 | A1* | 2/2022 | Li | H04L 67/51 |
| 2022/0114475 | A1* | 4/2022 | Zhu | G06N 3/084 |
| 2022/0294606 | A1* | 9/2022 | Norrman | G06N 20/00 |
| 2022/0386209 | A1* | 12/2022 | Roeland | H04W 36/324 |
| 2023/0153633 | A1* | 5/2023 | Mohalik | G06N 20/00 706/25 |
| 2023/0169402 | A1* | 6/2023 | Mathur | G06N 3/098 706/12 |
| 2023/0289615 | A1* | 9/2023 | Vandikas | G06F 21/6254 |
| 2023/0409962 | A1* | 12/2023 | Butt | G06N 20/00 |

FOREIGN PATENT DOCUMENTS

| | | | |
|---|---|---|---|
| CN | 110956202 | A | 4/2020 |
| CN | 111176929 | A | 5/2020 |
| CN | 111369042 | A | 7/2020 |
| CN | 111460443 | A | 7/2020 |
| CN | 111611610 | A | 9/2020 |
| CN | 111708640 | A | 9/2020 |
| CN | 111866954 | A | 10/2020 |
| CN | 111898768 | A | 11/2020 |

OTHER PUBLICATIONS

3GPP TR 22.874 VO.1.0 (Sep. 2020); 3rd Generation Partnership Project; Technical Specification Group Services and System Aspects; Study on traffic characteristics and performance requirements for AI/ML model transfer in 5GS (Release 18), 55 pages.

Li et al., "Federated Learning Challenges, Methods, and Future Directions", arXiv:1908.07873v1 [cs.LG], Aug. 21, 2019, 21 pages.

3GPP TS 23.288 V16.5.0 (Sep. 2020); 3rd Generation Partnership Project; Technical Specification Group Services and System Aspects; Architecture enhancements for 5G System (5GS) to support network data analytics services (Release 16), 65 pages.

3GPP TS 38.101-3 V16.4.0 (Jun. 2020); 3rd Generation Partnership Project; Technical Specification Group Radio Access Network; NR; User Equipment (UE) radio transmission and reception; Part 3: Range 1 and Range 2 Interworking operation with other radios (Release 16), 461 pages.

3GPP TS 38.300 V16.2.0 (Jul. 2020); 3rd Generation Partnership Project; Technical Specification Group Radio Access Network; NR; NR and NG-RAN Overall Description; Stage 2 (Release 16), 148 pages.

Combined Chinese Office Action and Search Report issued Jun. 18, 2025 in Chinese Patent Application No. 202080003279.2 with English translation, 17 pgs.

* cited by examiner 1400
1402
1404
memory
processing component
1406
power component
1408
multimedia component
1410
audio component
processor
1420
communication component
1416
1414
sensor component
I/O interface
1412

DATA PROCESSING METHOD AND APPARATUS, COMMUNICATION DEVICE, AND STORAGE MEDIUM

CROSS-REFERENCE TO RELATED APPLICATIONS

The present application is a U.S. National Stage of International Application No. PCT/CN2020/128152, filed on Nov. 11, 2020, the contents of which are incorporated herein by reference in their entireties for all purposes.

BACKGROUND

With the development of artificial intelligence technology, machine learning has been applied in more and more fields. However, sources of training data for many machine learning models are distributed among different institutions. These institutions generally do not share data, and the issue of data privacy and security needs to be considered. In addition, the number of wireless network user is rapidly increasing, and different users have different specific requirements for the model. Using a unified model will greatly reduce the accuracy of the model.

SUMMARY

The embodiments of the present disclosure relate to, but is not limited to, the field of wireless communication, and in particular to a data processing method and apparatus, a communication device, and a storage medium. The present disclosure provides a data processing method and apparatus, a communication device, and a storage medium.

According to the first aspect of the embodiments of the present disclosure, a data processing method is provided. The data processing method is applied to a base station and includes:

- determining a distribution characteristic of a local dataset of at least one user equipment (UE); and
- scheduling, based on the distribution characteristic of the local dataset, a target UE from the at least one UE for participating in federated learning.

According to the second aspect of the embodiments of the present disclosure, a data processing method is provided. The data processing method is applied to a user equipment (UE) and includes:

- receiving scheduling information, wherein the scheduling information is sent by a base station based on a distribution characteristic of a local dataset of the UE for scheduling federated learning.

According to the third aspect of the embodiments of the present disclosure, a communication device is provided. The communication device at least includes a processor and a memory used for storing executable instructions capable of running on the processor, wherein

- when the processor is used for running the executable instructions, the executable instructions execute steps in any one of the methods for determining the processing time described above.

According to the fourth aspect of the embodiments of the present disclosure, a non-temporary computer-readable storage medium is provided. The computer-readable storage medium stores computer-executable instructions, the computer-executable instructions, when executed by a processor, implement steps in any one of the methods for determining the processing time described above.

BRIEF DESCRIPTION OF THE DRAWINGS

The accompanying drawings herein are incorporated into the specification and form a part of this specification, showing principles consistent with the embodiments of the present disclosure, and are used to explain the principles of the embodiments of the present disclosure together with the specification.

DETAILED DESCRIPTION

Figure 1:
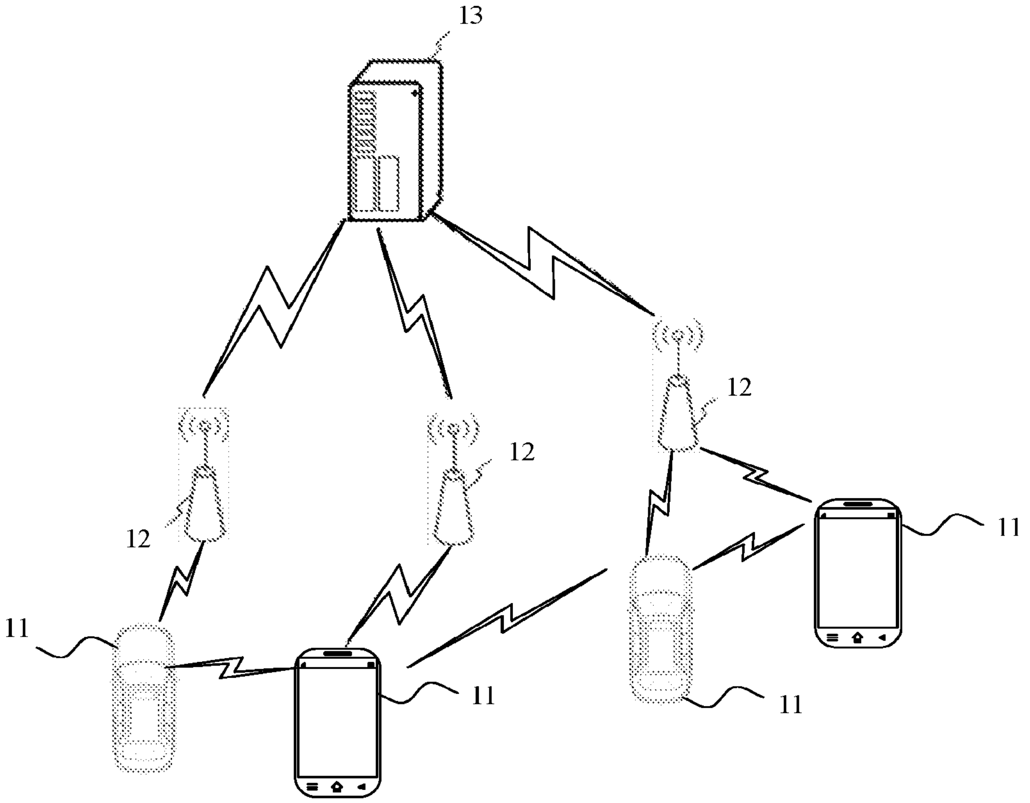
FIG. 1 is a schematic structure diagram of a wireless communication system illustrated according to an embodiment.

Embodiments will be described herein in detail, examples of which are represented in the drawings. Where the following description relates to the drawings, the same numerals in different drawings indicate the same or similar elements unless otherwise indicated. The embodiments described in the following embodiments do not represent all implementations consistent with the embodiments of the present disclosure. On the contrary, they are only examples of apparatus and methods consistent with some aspects of the embodiments of the present disclosure, as detailed in the appended claims.

The terms used in the embodiments of the present disclosure are only for the purpose of describing specific embodiments, and are not intended to limit the embodiments of the present disclosure. The "a" and "the" in the singular form used in the embodiments of the present disclosure and the appended claims are also intended to include a plurality of forms, unless the context clearly indicates other meanings. It should also be understood that the term "and/or" used herein refers to and includes any or all possible combinations of one or more associated listed items.

It should be understood that although the terms of first, second, third and the like may be used to describe various information in the embodiments of the present disclosure, such information should not be limited to these terms. These terms are only used to distinguish the information of the same type from each other. For example, without departing from the scope of the embodiments of the present disclosure, the first information may also be called the second information, similarly, the second information may also be called the first information. Depending on the context, the words "if" and "in case of" used herein may be interpreted as "when" or "at the time of" or "in response to determination of".

In order to better describe any embodiment of the present disclosure, an embodiment of the present disclosure takes an application scenario of access control as an example for illustrative explanation.

Please refer to FIG. 1, which shows a schematic structure diagram of a wireless communication system provided by an embodiment of the present disclosure. As shown in FIG. 1, the wireless communication system is a communication system based on cellular mobile communication technology, and may include several terminals 11 and several base stations 12.

The terminal 11 may be a device that provides voice and/or data connectivity to a user. The terminal 11 may communicate with one or more core networks through a radio access network (RAN). The terminal 11 may be an IoT terminal, such as a sensor device, a mobile phone (or a "cellular" phone), or a computer with an IoT terminal. For example, the terminal 11 may be a fixed, portable, pocket, handheld, computer built-in, or vehicle-mounted device. For example, the terminal 11 may be a station (STA), subscriber unit, subscriber station, mobile station, mobile, remote station, access point, remote terminal, access terminal, user terminal, user agent, user device or user equipment (terminal). Alternatively, the terminal 11 may also be a device of an unmanned aerial vehicle. Alternatively, the terminal 11 may also be a vehicle-mounted device, such as a trip computer with a wireless communication function or a wireless terminal externally connected to a trip computer. Alternatively, the terminal 11 may also be a road side device, such as a street light, signal light, or other road side devices with a wireless communication function.

The base station 12 may be a network-side device in the wireless communication system. The wireless communication system may be the fourth generation mobile communication (4G) system, also known as the long term evolution (LTE) system. Alternatively, the wireless communication system may also be a 5G system, also known as a new radio (NR) system or a 5G NR system. Alternatively, the wireless communication system may be the next generation of the 5G system. The access network in the 5G system may be called the new generation-radio access network (NG-RAN).

The base station 12 may be an evolved base station (eNB) used in a 4G system. Alternatively, the base station 12 may also be a base station (gNB) with a centralized distributed architecture in a 5G system. When adopting the centralized distributed architecture, the base station 12 typically includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. The embodiments of the present disclosure do not limit the specific implementations of the base station 12.

A wireless connection may be established between the base station 12 and the terminal 11 via a wireless air interface. In a different implementation, the wireless air interface is based on the fourth generation mobile communication network technology (4G) standard. Alternatively, the wireless air interface is based on the fifth generation mobile communication network technology (5G) standard, for example, the wireless air interface is a new air interface. Alternatively, the wireless air interface may also be based on the next generation mobile communication network technology standard of 5G.

In some embodiments, an end to end (E2E) connection may also be established between terminals 11. For example, scenarios such as vehicle to vehicle (V2V) communication, vehicle to infrastructure (V2I) communication, and vehicle to pedestrian (V2P) communication in vehicle to everything (V2X) communication.

In some embodiments, the aforementioned wireless communication system may also include a network management device 13.

Several base stations 12 are respectively connected to the network management device 13. In these embodiments, the network management device 13 may be a core network device in the wireless communication system, for example, the network management device 13 may be a mobility management entity (MME) in the evolved packet core (EPC). Alternatively, the network management device may also be other core network devices, such as a service gateway (SGW), public data network gateway (PGW), policy and charging rules function (PCRF), or home subscriber server (HSS). The implementation forms of the network management device 13 are not limited by the embodiments of the present disclosure.

In the training of an artificial intelligence model based on the aforementioned wireless communication system, federated learning can effectively solve the problem of data privacy. The federated learning is a machine learning framework that can effectively assist a plurality of institutions in data usage and machine learning modeling while satisfying the requirements of user privacy protection, data security, and government regulations. In the federated learning, a model can be directly trained at the user end, and only the result of the model training is transmitted, thus effectively protecting data privacy of the user. With the increase in the number of wireless network users, the data volume transmitted by the network is also increasing at an astonishing rate. How to reduce the model accuracy lost in wireless transmission, and at the same time, develop more personalized model solutions for each user to make the model more suitable for the user's specific requirements is an important topic worth studying.

Figure 2:
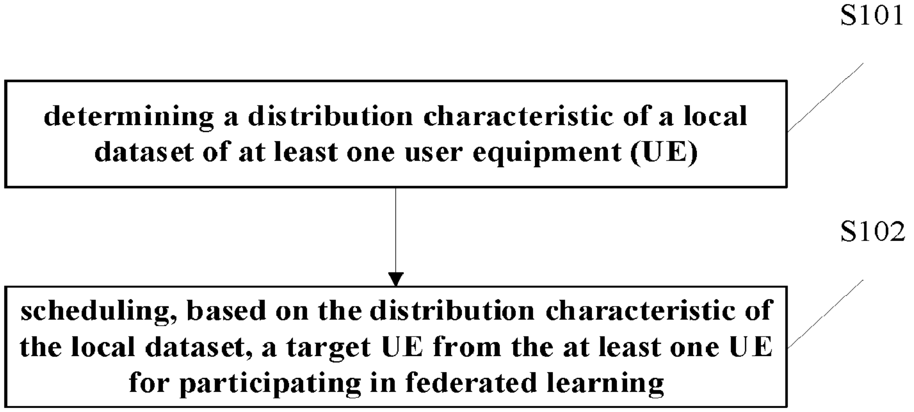
FIG. 2 is a schematic flowchart of a data processing method illustrated according to an embodiment.

As shown in FIG. 2, the embodiments of the present disclosure provide a data processing method. The data processing method is applied to a base station and includes the following steps S101~102.

In the step S101, a distribution characteristic of a local dataset of at least one user equipment (UE) is determined.

In the step S102, a target UE from the at least one UE is scheduled for participating in federated learning based on the distribution characteristic of the local dataset.

In the embodiments of the present disclosure, the base station may establish communication connections with a plurality of UE and schedule at least a portion of the UE for performing the federated learning. The process of the federated learning requires the local data of the UE to satisfy certain requirements, such as the data volume and the number of data types of the data related to the federated learning. Hence, the base station may determine which UE to schedule for participating in the federated learning based on the distribution characteristic of the local dataset of the plurality of UE.

Herein, the distribution characteristic of the local dataset refers to the distribution characteristic of the dataset related to the federated learning generated locally during usage of the UE. The distribution characteristic of the local dataset may include the distribution of data types or the distribution of data volume of different data types.

In the embodiments of the present disclosure, the base station schedules the UE for the federated learning. The base station may directly determine whether to schedule the UE by receiving the distribution characteristic of the local dataset reported by the UE, or the base station may receive a portion of the parameter of the local dataset reported by the UE and obtain the distribution characteristic of the local dataset through processing.

In one embodiment, the base station may send scheduling information to the target UE scheduled for participating in the federated learning, so that the UE may determine its own participation in the federated learning. In another embodiment, the base station may also directly send initial model information to the target UE scheduled for participating in the federated learning, so that the UE may determine its own participation in the federated learning and start the federated learning based on the initial model information.

In this way, the base station can utilize the distribution characteristic of the local dataset of the UE to schedule the UE that can participate in the federated learning from a plurality of candidate UE that have established communication connections with the base station, and jointly perform the federated learning with the UE participating in the federated learning. In this way, direct scheduling of the base station can be achieved without the need for the UE to report data to the core network or data center, greatly improving training efficiency.

In some embodiments, the scheduling, based on the distribution characteristic of the local dataset, the target UE from the at least one UE for participating in the federated learning includes:

obtaining statistical information of a distribution difference between the local dataset and a global dataset for each of the at least one UE; and scheduling, based on the statistical information of the distribution difference, the target UE from the at least one UE for participating in the federated learning.

In the embodiments of the present disclosure, the base station may determine the statistical information of the distribution difference based on the distribution characteristic of the above local dataset of each of the at least one UE and the distribution characteristic of the global dataset of the base station, and schedule based on the statistical information of the distribution difference.

Herein, since the base station may perform data interaction with a plurality of UE, the plurality of UE may participate in the federated learning corresponding to the base station. There is a difference in the probability distribution of data of the local dataset of each of the at least one UE and data of the data set of the plurality of UE associated with the base station, or in the probability distribution of data of the local dataset of each of the at least one UE and data of the global dataset obtained through operations. Hence, the statistical information of the distribution difference described above may be used to determine which UE can participate in the federated learning, and then the determined UE can be scheduled.

Herein, the statistical information of the distribution difference refers to the difference between the distribution of various data types or data values in the local dataset and the distribution of various data types or data values in the global dataset. Since the global dataset is at least composed of data from a plurality of the at least one UE associated with the base station, the global dataset reflects the overall distribution of the data. Hence, there is a difference between the distribution of the local dataset of each of the at least one UE and the distribution of the global dataset. In the embodiments of the present disclosure, the above statistical information of the distribution difference is used for reflecting the above difference.

Herein, the above distribution may include the distribution of data types in the dataset. Alternatively, the above distribution may be the proportion of each data type or the data volume of different data types. The statistical information of the distribution difference refers to the difference in the aforementioned data types, the difference in the proportion of each data type, and the difference in the data volume of each data type in the local dataset.

For example, the above distribution may be the probability distribution of each data type in the dataset. The probability distribution of the local dataset obtained by the UE through statistics is denoted as $P(X_m)=[P(x_1), P(x_2), \ldots, P(x_n)]$, where $P(x_i)$ represents the probability of $X_m$ taking the event as $x_i$. The base station counts the distribution of the global dataset based on the statistical result of the probability distribution of the local dataset reported by each UE, and the probability distribution of the global dataset is denoted as $P(X_g)=\Sigma P(X_m)$. The base station may obtain the above statistical information of the distribution difference based on the probability distribution of the UE and the probability distribution of the global dataset described above. The statistical information of the distribution difference is denoted as $\Delta P_m=\|P(X_g)-P(X_m)\|$, the meaning of which may be the difference in values of the probability distribution of each data type, or the difference in data types included in the probability distribution. The base station may schedule the corresponding UE based on the value of the statistical information of the distribution difference.

It should be noted that the base station may receive the local dataset reported by each of the at least one UE, and then obtain the above global dataset through counting. The base station may obtain the statistical information of the distribution difference described above by calculating the probability distribution of the local dataset of the UE and the probability distribution of the global dataset separately. The base station may also directly receive the probability distribution reported by each of the at least one UE counted based on the local dataset, calculate the probability distribution of the global dataset, and obtain the statistical information of the distribution difference.

In one embodiment, in the federated learning, the UE perceives and collects data to generate the local dataset, and processes the local dataset to generate a local training set; the UE randomly initializes a local model parameter, performs local learning model training by using a local training set, and uploads the training result to the core network or data center; the base station requests the local training result of the UE from the core network or data center, and obtains an updated result of the global learning model by performing the federated average learning using the local learning result of each UE; the base station feeds back the updated result to the UE via the network, and the UE fine tunes the local model based on the result of the feedback; the above process is repeated until the model accuracy satisfies the requirements. When the model training is completed, each base station reports the model training result and the statistical characteristic of the training data to the network, and the network selects the appropriate model according to the characteristic of the task data.

The data interaction between the base station and the UE needs to be carried out through the core network or data center. The UE needs to upload the data of the training result to the core network or data center, and the base station then requests the data. This mode does not support direct federated learning between the base station and the UE, reducing the efficiency of the federated learning and the utilization rate of the wireless network resource. The model training is not performed after data adaptation performed according to different UE requirements, resulting in insufficient model accuracy.

Compared to this, the above steps in the embodiments of the present disclosure utilize the base station to directly schedule the UE for participating in the federated learning, without the need for the UE to report data to the core network or data center, which can greatly improve the training efficiency. Moreover, since the base station schedules the corresponding UE based on the probability distribution of the dataset of each of the at least one UE, the adaptability of different UE for participating in the federated learning is taken into account, which facilitates improving the accuracy of model training.

In Some Embodiments, the Method Further Includes:

obtaining capability information of the at least one UE.

In these embodiments, the scheduling, based on the distribution characteristic of the local dataset, the target UE from the at least one UE for participating in the federated learning includes:

scheduling, based on the distribution characteristic of the local dataset and the capability information of the at least one UE, the target UE from the at least one UE for participating in the federated learning.

In the embodiments of the present disclosure, the capability of the at least one UE for participating in the federated learning may also be considered, and the target UE to be scheduled for participating in the federated learning may be jointly determined based on the distribution characteristic of the local dataset and the capability information described above.

The capability information of the at least one UE described above is the capability of the at least one UE to perform the federated learning, and may include processing capability of the at least one UE required for the federated learning if participating in the federated learning. If the capability of the at least one UE is insufficient for the federated learning, then even if the distribution characteristic of the local dataset of the at least one UE satisfies the requirement of the base station, the at least one UE cannot be scheduled to participate in the federated learning.

In one embodiment, the performance requirement of the model required for the federated learning may also be considered. If the at least one UE cannot satisfy the performance requirement of the model, the at least one UE cannot be scheduled to participate in the federated learning. If the at least one UE satisfies the performance requirement of the model, and the capability information of the at least one UE satisfies the processing capability required for the federated learning, the base station can determine whether to schedule the at least one UE based on the statistical information of the distribution difference corresponding to the at least one UE.

In this way, the base station evaluates whether the UE can be scheduled for participating in the federated learning from a plurality of perspectives such as the data and processing capability of the UE, and the performance requirement for the model, improving the efficiency and accuracy of the federated learning and enhancing the adaptability of the model to user data.

In Some Embodiments, the Capability Information of the at Least One UE Includes at Least One of:

computing capability information, indicating computing capability of the UE; or communication status information, indicating communication capability and/or a communication channel status of the UE.

The capability required for the at least one UE in the federated learning may include the computing capability of the UE. Due to the need to collect a large amount of data and perform the model training based on the data when a UE performs the federated learning, a UE without sufficient computing capability cannot perform the aforementioned federated learning.

The above capability information may also include the communication capability of the UE. During the process of the federated learning, the UE needs to report the training result to the base station and receive the updated model sent by the base station. Hence, in order to ensure the efficiency and accuracy of the federated learning, the communication capability of the UE for participating in the federated learning and the communication channel status between the UE and the base station are also needed to be considered.

Herein, the communication capability of the UE may be device hardware capability of the UE, such as the network type and the bandwidth supported by the UE and so on. The communication channel status of the UE refers to the status of the channel established between the UE and the base station, including the bandwidth, the transmission rate, the congestion status, the interference status of the channel and so on.

In some embodiments, the communication status information includes: channel quality indication (CQI) information detected by the UE.

In the embodiments of the present disclosure, the base station may obtain the communication channel status of the UE by acquiring the CQI information. The CQI is detected by the UE and may include downlink channel quality, or may include uplink channel quality.

Since the CQI is only carried by a few bits, the base station can quickly and easily acquire the basic status of the communication channel corresponding to the UE by obtaining the CQI detected by the UE, and schedule the UE according to the value of the CQI.

In some embodiments, the method further includes: determining, based on statistical information of a distribution difference between the local dataset of the target UE and a global dataset of the base station, a weight coefficient of the target UE in the federated learning.

Considering that different UE have different data characteristics and the importance of the UE to the global is different in the process of the federated learning, the base station may determine the weight coefficient corresponding to each target UE according to the above-described statistical information of the distribution difference of each UE.

In this way, in the process of the federated learning, the relevant model parameter of each UE is processed according to the weight coefficient of each target UE, and the final training result of the federated learning is obtained through training. In this way, the adaptability of the model obtained through the federated learning to each UE can be improved, and a more accurate model can be obtained.

In some embodiments, the statistical information of the distribution difference includes: a probability distribution difference.

The determining, based on the statistical information of the distribution difference between the locally stored local dataset of the target UE and the global dataset, the weight coefficient of the target UE includes:

determining the weight coefficient of the target UE based on the probability distribution difference corresponding to a single target UE and a sum of probability distribution differences of all the target UE performing a same federated learning.

In the embodiments of the present disclosure, the base station may obtain the probability distribution of the local dataset of each target UE, and obtain the probability distribution of the global dataset according to the probability distribution of each target UE. The above probability distribution of each target UE differs from the probability distribution of the global dataset. The above probability distribution difference is the difference between the probability distribution of the data in the local dataset of a single target UE and the probability distribution of the data in the global dataset of the base station. The above probability distribution difference may be the difference in the value of the probability distribution of each data type, or the difference in the data type included in the probability distribution.

Each target UE of the base station has its own local dataset, so there is a corresponding probability distribution difference for each target UE. Herein, the sum of the probability distribution differences may be obtained by summing the probability distribution difference corresponding to each target UE of the base station.

Hence, the base station may determine the statistical information of the distribution difference by counting the above probability distribution difference corresponding to each target UE and the sum of the above probability distribution differences.

For example, calculating the weight coefficient of the user in the federated average learning based on the statistical information of the distribution difference between the local dataset of each target UE and the global dataset may be expressed as the following formula (1):

$$a_m = \frac{1/\Delta P_m}{\sum_{m=1}^{M} 1/\Delta P_m} \quad \text{(Formula 1)}$$

Herein, M represents the total number of the target UE participating in the federated learning, am represents the weight of the local learning model of a user m in the federated averaging process, and $\Delta P_m$ represents the probability distribution difference between the local dataset of each user and the global dataset.

In Some Embodiments, the Method Further Includes:

receiving model information of a local model reported by the target UE for performing the federated learning;

determining, based on the statistical information of the distribution difference between the locally stored local dataset of the target UE and the global dataset, the weight coefficient of the target UE; and obtaining a global learning model by performing, based on the weight coefficient of the target UE and the model information of the local model, weighted averaging on the local model of a plurality of the target UE.

In the process of the federated learning, each target UE separately performs the model training locally by using the local data, and reports the training result, including the model parameter and other model information, to the base station. The base station obtains the above global learning model by training the global model according to the model information reported by each target UE.

In addition, since each target UE only needs to report its own training result, that is, the model information, to the base station during the process of the federated learning described above, the target UE's own local data will not be reported to the base station, reducing the risk of private data such as personal information being leaked.

In Some Embodiments, the Method Further Includes:

terminating, in response to the global learning model satisfying a subscription requirement of operation administration and maintenance (OAM), reception of the model information of the local model reported by the target UE for performing the federated learning.

Since a plurality of target UE and the base station participate in the process of the federated learning, the plurality of target UE perform the federated learning, update the local model, and report the model information to the base station while continuously obtaining the local data. The base station performs global learning according to the obtained model information of the local model of each target UE, so as to obtain the global model through training, and then the base station may send the global model to each target UE for the target UE to update the local model.

Hence, the above process of the federated learning may be seen as a cyclic interaction process between the base station and each target UE. In the embodiments of the present disclosure, determining whether the process of the federated learning may be terminated based on the subscription requirement of the OAM of the corresponding business of the current federated learning may be considered.

The subscription requirement of the OAM includes a specific requirement for model accuracy required by the subscribed business. Hence, when the global learning model satisfies the subscription requirement of the OAM, it means that the current global learning model has reached sufficient accuracy, and as a result, the federated learning may be terminated, and the global learning model that can be used is obtained.

In Some Embodiments, the Method Further Includes:

sending model information of the global learning model to the target UE in response to the global learning model not satisfying the subscription requirement of the OAM;

receiving model information of an updated local model updated by the target UE based on the global learning model; and updating the global learning model based on the updated local model and a weight coefficient corresponding to the updated local model of the target UE.

In these embodiments, after obtaining the model information of the local model of each target UE, the base station performs the global learning to obtain the global learning model. If the global learning model does not satisfy the subscription requirement of the OAM, the model information of the global learning model may be sent to each target UE, facilitating the target UE to update the local model.

It should be noted that during the process of updating the local model, the local dataset and the global dataset of the base station may also change, so the weight coefficient may also be updated. In other words, in the process of the federated learning, the weight coefficient is also constantly updated with the update of the model.

The target UE continues the federated learning according to the updated local model, obtains the updated model information, and reports the updated model information to the base station. In this way, a circular interaction for the federated learning is formed between the base station and the UE until the global learning model finally satisfies the above subscription requirement of the OAM.

In Some Embodiments, the Method Further Includes:

- reporting model information of the global learning model and training data for training the global learning model to OAM;
- receiving a model parameter determined by the OAM based on the model information of the global learning model, the training data and task data of the OAM; and
- updating the global learning model based on the model parameter.

In the embodiments of the present disclosure, the base station may obtain the subscription requirement for terminating the federated learning through the OAM. In addition, the OAM may also update the target global learning model according to the global learning model obtained through the federated learning.

The OAM may be an operation administration and maintenance module applied to the core network, and collect, based on each cell of the corresponding business, the training data of the global learning model corresponding to different base stations performing the federated learning. The OAM may obtain the task data reported by the task cell through each base station, determine the corresponding probability distribution difference information based on the task data and the training data of each base station, and send the model information of the training model obtained by fusing a plurality of base stations to the base station for the base station to update the global learning model according to the received model parameter.

In Some Embodiments, the Method Further Includes:

- determining, in response to detecting a handover occurs to the target UE connected to the base station, that the target UE exits the federated learning.

In the embodiments of the present disclosure, the target UE needs to maintain a communication connection with the base station when performing the federated learning to maintain data interaction. Hence, if the base station detects that a handover occurs to the target UE participating in the federated learning connected to the base station, for example, if the UE has undergone cell reselection, the result of the federated learning of the target UE cannot be used anymore. Hence, at this point, the base station may determine that the target UE exits the federated learning described above.

For example, if the base station detects that a handover occurs to the target UE connected to the base station, the weight coefficient corresponding to the target UE is adjusted to 0, so that the base station does not continue to send the model information to this UE, nor does it continue to receive the model information reported by this UE.

The embodiments of the present disclosure also provide a data processing method. The data processing method is applied to a base station and includes:

- obtaining statistical information of a distribution difference between the local dataset and a global dataset for each of the at least one UE; and
- scheduling, based on the statistical information of the distribution difference, the target UE from the at least one UE for participating in the federated learning.

Herein, since the base station may perform data interaction with a plurality of UE, the plurality of UE may participate in the federated learning corresponding to the base station. There is a difference in the probability distribution of data of the local dataset of each candidate UE and data of the data set of the plurality of UE associated with the base station, or in the probability distribution of data of the local dataset of each candidate UE and data of the global dataset obtained through operations. Hence, the statistical information of the distribution difference described above may be used to determine which UE can participate in the federated learning, and then the determined UE can be scheduled.

Herein, the statistical information of the distribution difference refers to the difference between the distribution of various data types or data values in the local dataset and the distribution of various data types or data values in the global dataset. Since the global dataset is at least composed of data from a plurality of candidate UE associated with the base station, the global dataset reflects the overall distribution of the data. Hence, there is a difference between the distribution of the local dataset of each candidate UE and the distribution of the global dataset. In the embodiments of the present disclosure, the above statistical information of the distribution difference is used for reflecting the above difference.

Herein, the above distribution may include the distribution of data types in the dataset. Alternatively, the above distribution may be the proportion of each data type or the data volume of different data types. The statistical information of the distribution difference refers to the difference in the aforementioned data types, the difference in the proportion of each data type, and the difference in the data volume of each data type in the local dataset.

The base station may directly receive the statistical information of the distribution difference reported by the UE. For example, the base station sends the distribution information of the global dataset to the UE. The UE determines the above statistical information of the distribution difference based on the distribution characteristic of the local dataset and the received distribution information of the global dataset, and reports the determined statistical information of the distribution difference to the base station. The base station may also receive the distribution information of the local dataset reported by the UE, and determine the above statistical information of the distribution difference based on the distribution information of the UE and the distribution information of the global dataset, and then determine whether to schedule the UE for participating in the federated learning.

In one embodiment, the base station may schedule the UE for participating in the federated learning by sending scheduling information to the UE to instruct the UE for participating in the federated learning.

The embodiment of the present disclosure may be executed independently or combined with at least one of the above embodiments. Any at least two embodiments described above may also be split or combined, and the order of each step may be adjusted according to the actual application scenario, which are not limited herein.

Figure 3:
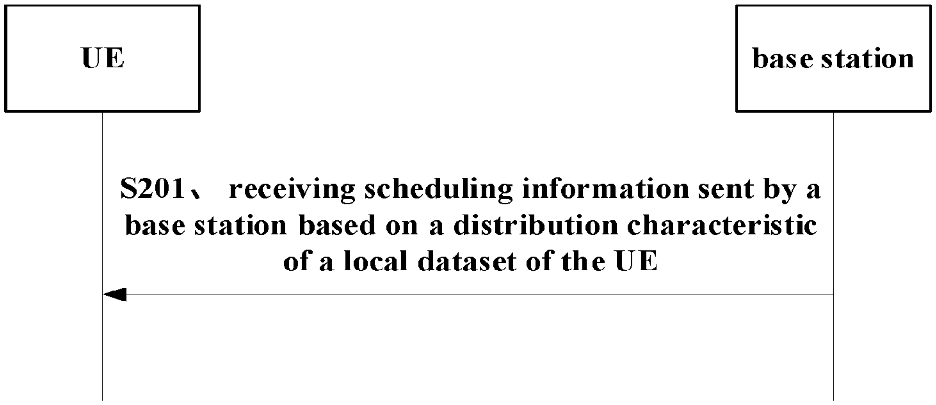
FIG. 3 is another schematic flowchart of a data processing method illustrated according to an embodiment.

As shown in FIG. 3, the embodiments of the present disclosure provide a data processing method. The method is applied to a UE and includes the following step S201.

In the step S201, scheduling information sent by a base station based on a distribution characteristic of a local dataset of the UE is received, herein, the scheduling information is used for determining whether the UE is the target UE being scheduled for participating in the federated learning.

In the embodiments of the present disclosure, the UE may report the distribution characteristic of its own local dataset to the base station, or may also report a portion of the data in the local dataset for the base station to determine the above distribution characteristic and send the scheduling information.

After receiving the scheduling information, the UE may know that it has been scheduled by the base station as the target UE for participating in the federated learning, and may perform the aforementioned federated learning based on the local dataset.

In the embodiments of the present disclosure, the base station may establish communication connections with a plurality of UE and schedule at least a portion of the plurality of UE for performing the federated learning. The process of the federated learning requires the local data of the UE to satisfy certain requirements, such as the data volume and the number of data types of the data related to the federated learning. Hence, the base station may determine which UE to schedule for participating in the federated learning based on the distribution characteristic of the local dataset of the plurality of UE.

Herein, the distribution characteristic of the local dataset refers to the distribution characteristic of the dataset related to the federated learning generated locally during usage of the UE. The distribution characteristic of the local dataset may include the distribution of data types or the distribution of data volume of different data types.

In some embodiments, the receiving the scheduling information sent by the base station based on the distribution characteristic of the local dataset of the UE includes:

receiving the scheduling information sent by the base station based on statistical information of a distribution difference obtained according to the distribution characteristic of the local dataset of the UE and a distribution characteristic of a global dataset.

In the embodiments of the present disclosure, the UE may report the probability distribution information of its own local dataset to the base station for the base station to determine the above statistical information of the distribution difference. The UE may also receive the probability distribution information of the global dataset sent by the base station, determine the statistical information of the distribution difference, and report the statistical information of the distribution difference to the base station. Since the base station may determine whether to schedule the candidate UE as the target UE based on the statistical information of the distribution difference described above, hence, after receiving the scheduling information, the UE may know that it has been scheduled by the base station as the target UE for participating in the federated learning, and may perform the aforementioned federated learning based on the local dataset.

Of course, if the UE does not receive the aforementioned scheduling information, this UE will not participate in the federated learning.

In Some Embodiments, the Method Further Includes:

reporting capability information, herein, the capability information is used for the base station to send the scheduling information based on the distribution characteristic of the local dataset and the capability information.

Since the capability of the candidate UE for participating in the federated learning may also be considered, and the target UE being scheduled for participating in the federated learning may be jointly determined based on the distribution characteristic of the local dataset and the capability information described above, hence, the UE may report its own capability information to the base station for the base station to determine whether the UE satisfies the requirement of the federated learning.

It should be noted that the UE may report its own capability information after establishing the communication connection with the base station, or the UE may report the capability information based on the request of the base station. When reporting the capability information, if the scheduling information sent by the base station is received, the UE may participate in the federated learning. If no scheduling information is received, the UE will not participate in the federated learning.

In Some Embodiments, the Capability Information Includes at Least One of:

computing capability information, indicating computing capability of the UE; or communication status information, indicating communication capability and/or a communication channel status of the UE.

The capability required for the candidate UE in the federated learning may include the computing capability of the UE. Due to the need to collect a large amount of data and perform the model training based on the data when a UE performs the federated learning, a UE without sufficient computing capability cannot perform the aforementioned federated learning.

The above capability information may also include the communication capability of the UE. During the process of the federated learning, the UE needs to report the training result to the base station and receive the updated model sent by the base station. Hence, in order to ensure the efficiency and accuracy of the federated learning, the communication capability of the UE for participating in the federated learning and the communication channel status between the UE and the base station are also needed to be considered.

Herein, the communication capability of the UE may be device hardware capability of the UE, such as the network type and the bandwidth supported by the UE and so on. The communication channel status of the UE refers to the status of the channel established between the UE and the base station, including the bandwidth, the transmission rate, the congestion status, the interference status of the channel and so on.

In some embodiments, the communication status information includes: channel quality indication (CQI) information, and the method further includes:

detecting the CQI information of a channel between the UE and the base station.

When determining whether a UE can participate in the federated learning, the communication status between the UE and base station needs to be considered. Hence, the UE may detect the CQI information of the channel in real-time and report the detected CQI information to the base station for the base station to determine whether the communication channel between the UE and the base station satisfies the requirement for the federated learning.

In Some Embodiments, the Method Further Includes:

reporting model information of a local model of the UE, herein, the local model is used for the base station to perform the federated learning based on the local model and a weight coefficient of the UE, and the weight coefficient of the UE is determined by the base station based on statistical information of a distribution difference between the local dataset of the UE and a global dataset of the base station.

If a UE is scheduled for participating in the federated learning, the UE may train the local model based on the local dataset and report the model information obtained through training to the base station. In this way, the base station may train the global learning model based on the model information reported by this UE and other UE.

It should be noted that the above federated learning is a process of model training jointly participated by the base station and each UE. The UE trains the local model locally and reports the training result to the base station. The base station performs weighted averaging and other processing based on the reported result and the weight coefficient of each UE to obtain the global learning model.

In Some Embodiments, the Method Further Includes:

generating the local dataset based on collected wireless network data;

generating a local training dataset by extracting data from the local dataset; and obtaining the local model by performing model training using the local training dataset.

During the process of the federated learning, the UE needs to utilize locally collected data. The locally collected data may be wireless network data, that is, data generated in the process of business use of a user. The UE generates the local dataset based on the collected data. If the data volume of the local dataset is large, data extraction may also be carried out, for example, a portion of data is extracted using sampling as the local training dataset. In some embodiments, if the data volume of the local dataset is small, the local dataset may also be directly used as the training dataset described above.

The federated learning, i.e., the model training, may be performed by utilizing the local training dataset described above and the initial model obtained from the base station to obtain the local model described above.

When reporting, the UE may only report the model information of the local model without reporting the local data, reducing the possibility of privacy leakage and improving the efficiency of model training.

In Some Embodiments, the Method Further Includes:

receiving model information of a global learning model sent by the base station;

obtaining an updated local model by performing the federated learning based on the model information of the global learning model;

reporting model information of the updated local model in response to the global learning model not satisfying a subscription requirement of operation administration and maintenance (OAM).

In the process of the federated learning, the base station may also send the model information of the global learning model obtained based on the model information of each UE to each UE. Hence, after receiving the model information of the global learning model, the UE may continue the federated learning, update the model information of the local model and then report the updated model information of the local model to the base station until the base station obtains a global learning model that satisfies the subscription requirement of the OAM.

In Some Embodiments, the Method Further Includes:

terminating the federated learning in response to the global learning model satisfying the subscription requirement of the OAM.

Since the above process of the federated learning may be seen as a cyclic interaction process between the base station and each target UE, in the embodiments of the present disclosure, determining whether the process of the federated learning may be terminated based on the subscription requirement of the OAM of the corresponding business of the current federated learning may be considered.

The subscription requirement of the OAM includes a list of analysis IDs, i.e., IDs of different analysis types. The list of analysis IDs may put forward specific requirement for the model accuracy required by the business. Hence, when the global learning model satisfies the subscription requirement of the OAM, it means that the current global learning model has reached sufficient accuracy, and as a result, the federated learning may be terminated, and the global learning model that can be used is obtained.

Herein, the UE may also obtain the final global learning model for local use.

In Some Embodiments, the Method Further Includes:

terminating the federated learning in response to detecting a handover occurs to the UE connected to the base station.

In the embodiments of the present disclosure, the target UE needs to maintain a communication connection with the base station when performing the federated learning to maintain data interaction. Hence, if a handover occurs to the UE connected to the base station, for example, if the UE has undergone cell reselection, it is not possible to for the UE to continue the federated learning with the base station scheduling the UE. Hence, at this point, the UE may exit the federated learning described above.

The embodiments of the present disclosure provide a data processing method. The data processing method is applied to a UE and includes:

reporting a distribution characteristic of a local dataset, herein, the distribution characteristic of the local dataset is used for a base station to determine whether to schedule the UE for participating in federated learning.

In the embodiments of the present disclosure, the base station may establish communication connections with a plurality of UE and schedule at least a portion of the UE for performing the federated learning. The process of the federated learning requires the local data of the UE to satisfy certain requirements, such as the data volume and the number of data types of the data related to the federated learning. Hence, the base station may determine which UE to schedule for participating in the federated learning based on the distribution characteristic of the local dataset of the plurality of UE.

Herein, the distribution characteristic of the local dataset refers to the distribution characteristic of the dataset related to the federated learning generated locally during usage of the UE. The distribution characteristic of the local dataset may include the distribution of data types or the distribution of data volume of different data types.

It should be noted that if a UE reports the distribution characteristic of the local dataset and the base station determines to schedule the UE for performing the federated learning based on the distribution characteristic of the local dataset reported by the UE, the UE may be determined to participate in the federated learning based on the received instructions from the base station, such as the scheduling information, and perform the model training based on the data in the local dataset.

The embodiment of the present disclosure may be executed independently or combined with at least one of the above embodiments. Any at least two embodiments of the present disclosure described above may also be split or combined, and the order of each step may be adjusted according to the actual application scenario, which are not limited herein.

The embodiments of the present disclosure also provide the following examples.

In the embodiments of the present disclosure, a data processing method is provided as follows.

A UE perceives and collects wireless network data, generates a local dataset, counts a distribution characteristic of the local dataset, and transmits the distribution characteristic information to a base station via a wireless channel. At the same time, computing capability and a real-time communication condition of the UE are reported to the base station.

The base station receives the information transmitted by the UE and counts the distribution difference between the local dataset of the UE and a global dataset based on the information. The base station schedules the UE based on the statistical result of the distribution difference, the computing capability and real-time communication condition reported by the UE, and the performance requirement of the learning model to determine whether the UE will participate in this federated learning. After each UE receives the scheduling result for the UE, if a UE participates in the federated learning, the local dataset is randomly sampled to generate a local training dataset, and a parameter of the local learning model is randomly initialized.

The UE and the base station start the federated learning. In each round of iterative learning, the UE determines the number of the training times of the local learning model based on the current available computing capability and real-time communication condition. After completing the training of the local learning model, the result is transmitted to the base station via a wireless channel. The base station updates the weight coefficient of the UE in the federated averaging based on whether a handover occurs to the UE and the statistical result of the distribution difference between the local dataset of each UE and the global dataset. When a handover occurs to a UE during the training, the UE may directly exit the process of the federated learning, and the base station updates the weight coefficient of the exited UE to zero. The base station performs the federated average learning to obtain an updated result of the global learning model. The base station feeds back the updated result of the global learning model to the UE via the wireless channel, and the UE updates the local learning model based on this result.

The base station monitors the training effectiveness of the global learning model. When a certain round of the updated model satisfies the subscription requirement of the OAM, the base station sends a signal to each UE to terminate the training, and the federated learning ends. When the model training is completed, each base station reports the result of the model training and the statistical characteristic of the training data to the OAM, the OAM selects the appropriate model according to the characteristic of the task data.

The embodiments of the present disclosure also provide a federated learning system, including a base station device and M user terminals. The base station device communicates with the user terminal via the wireless channel. The base station device of the present disclosure belongs to a functional unit of the base station, the user terminal is a terminal accessing the base station, and the base station coordinates each terminal for participating in the wireless federated learning.

The base station device for the federated learning provided in the embodiments of the present disclosure is responsible for: counting the distribution difference between the local dataset of the UE and the global dataset based on the data reported by the UE; scheduling the UE based on the data distribution difference, the computing capability and communication condition of the UE, and performance requirement of the learning model; calculating the weight coefficient of the UE in the federated average learning based on the distribution characteristic of the local dataset of the UE; and performing the federated average learning and updating the global learning model.

The base station device for the federated learning provided in the embodiments of the present disclosure specifically includes:

- a base station communication module, used for data transmission and control signaling interaction with the UE via the wireless channel, and for controlling the UE;
- a user scheduling module, used for scheduling the UE based on the data sent by the UE, computing capability, communication condition, performance requirement of the learning model, and other information;
- a model calculation and processing module, used for generating the averaged global learning model by federally averaging the training and updating result of the local learning model fed back by the UE;
- a transmission control module, used for specifying a data transmission scheme based on the characteristic of the data to be transmitted and the wireless communication condition;
- a model update module, used for updating the generated averaged global learning model and transmitting the obtained updated result of the global learning model to the UE via the wireless channel.

The user terminal for the federated learning provided in the embodiments of the present disclosure is responsible for: perceiving and collecting local wireless network data, and counting the distribution characteristic of the collected data; generating a local training set by randomly and uniformly sampling the collected data, and initializing the local learning model; determining the number of the local training times based on the real-time communication condition and computing capability and performing the local training; and updating the local learning model based on the updated result of the global learning model.

The user terminal for the federated learning provided in the embodiments of the present disclosure specifically includes:

- a user communication module, used for data transmission and control signaling interaction with the base station via the wireless channel;
- a data perception and storage module, used for generating a local training dataset of the UE by perceiving and collecting data generated by the UE, and storing this dataset;
- a model training and calculation module, used for training and updating the local learning model by using the data locally perceived and collected by the UE;

a transmission control module, used for specifying a data transmission scheme based on the characteristic of the data to be transmitted and the wireless communication condition.

Figure 4:
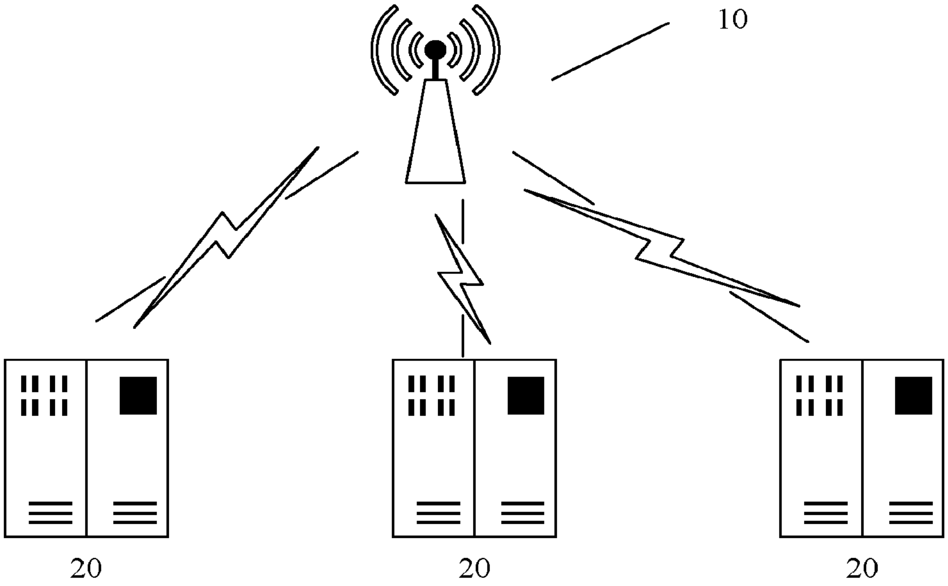
FIG. 4 is a schematic diagram of federated learning illustrated according to an embodiment.

As shown in FIG. 4, a schematic diagram of the federated learning in the embodiments of the present disclosure is presented. As shown in FIG. 4, the wireless federated learning system includes a base station device 10 and M user terminals 20 (i.e. the above UE). The user terminal 20 communicates with the base station device 10 via a wireless channel. Each UE stores its own local data, and the base station device aggregates and stores a large amount of data. The base station device of the present disclosure belongs to a functional unit of the base station. The user terminal is a terminal accessing the base station, and the base station coordinates each terminal for participating in the wireless federated learning using the local data.

Figure 5:
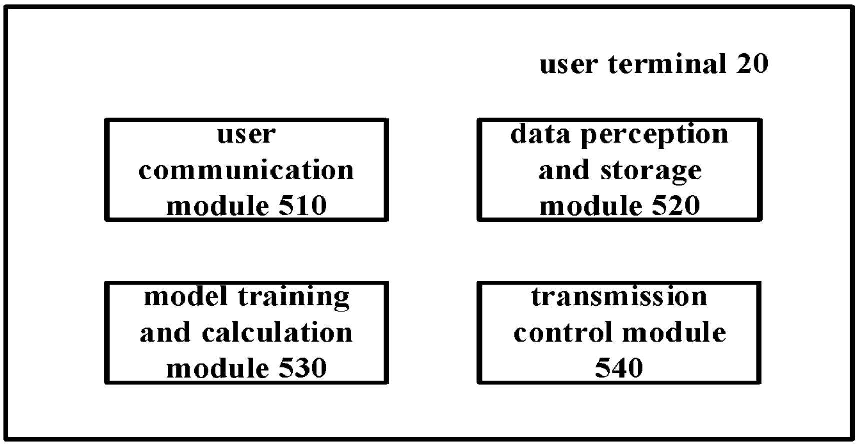
FIG. 5 is a structure block diagram of a user terminal for federated learning illustrated according to an embodiment.

As shown in FIG. 5, the user terminal 20 for the federated learning of the present disclosure specifically includes a user communication module 510, a data perception and storage module 520, a model training and calculation module 530, and a transmission control module 540. The specific functions and architecture of each module are detailed as follows.

The user communication module: the main function of this module is to perform data transmission and control signaling interaction with the base station via a wireless channel. The user communication module mainly includes a radio frequency functional unit and a baseband signal processing functional unit.

The data perception and storage module: the main function of this module is to perceive and collect data generated by the UE, generate the local training dataset of the UE, and store this dataset. The data perception and storage module mainly includes a data perception functional unit and a data storage functional unit.

The model training and calculation module: the main function of this module is to train and update the local learning model by using the data locally perceived and stored by the UE. The model training and calculation module mainly includes a data cache functional unit and a data calculation processing functional unit.

The transmission control module: the main function of this module is to specify a data transmission scheme based on the characteristic of the data to be transmitted and the wireless communication condition.

Figure 6:
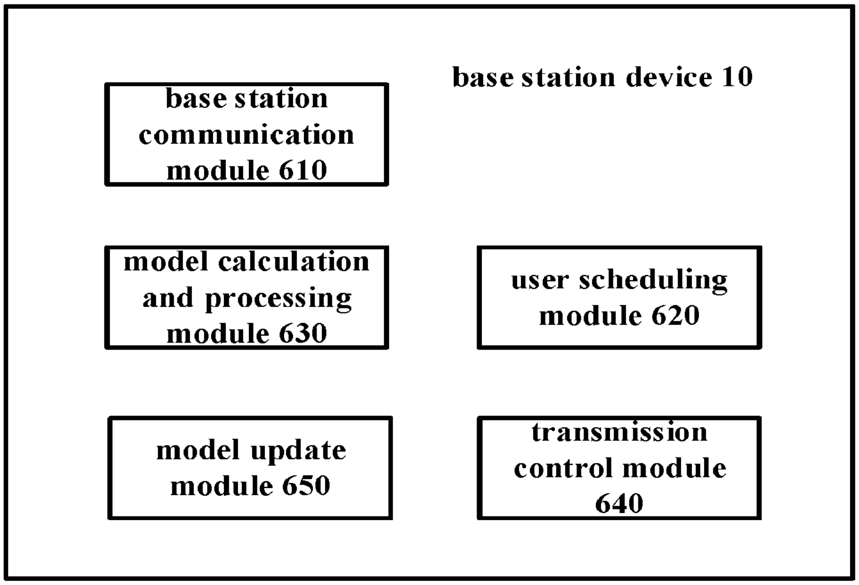
FIG. 6 is a structure block diagram of a base station device for federated learning illustrated according to an embodiment.

As shown in FIG. 6, the base station device 10 for the federated learning in the embodiments of the present disclosure specifically includes: a base station communication module 610, a user scheduling module 620, a model calculation and processing module 630, a transmission control module 640, and a model update module 650. The specific functions and architecture of each module are detailed as follows.

The base station communication module: the main function of this module is to perform data transmission and control signaling interaction with the UE via a wireless channel, and to control the UE. The base station communication module mainly includes a radio frequency functional unit, a baseband signal processing functional unit, and a user control functional unit.

The user scheduling module: the main function of this module is to schedule the UE based on the data sent by the UE, computing capability, communication condition, performance requirement of the learning model, and other information.

The model calculation and processing module: the main function of this module is to generate the averaged global learning model by federally averaging the training and updating result of the local learning model fed back by UE. The model calculation and processing module mainly includes a model cache functional unit and a model calculation processing functional unit.

The transmission control module: the main function of this module is to specify a data transmission scheme based on the characteristic of the data to be transmitted and the wireless communication condition.

The model update module: the main function of this module is to update the generated averaged global learning model, and transmit the obtained updated result of the global learning model to the UE via the wireless channel. The model update module mainly includes a discriminative functional unit and an update functional unit.

Figure 7:
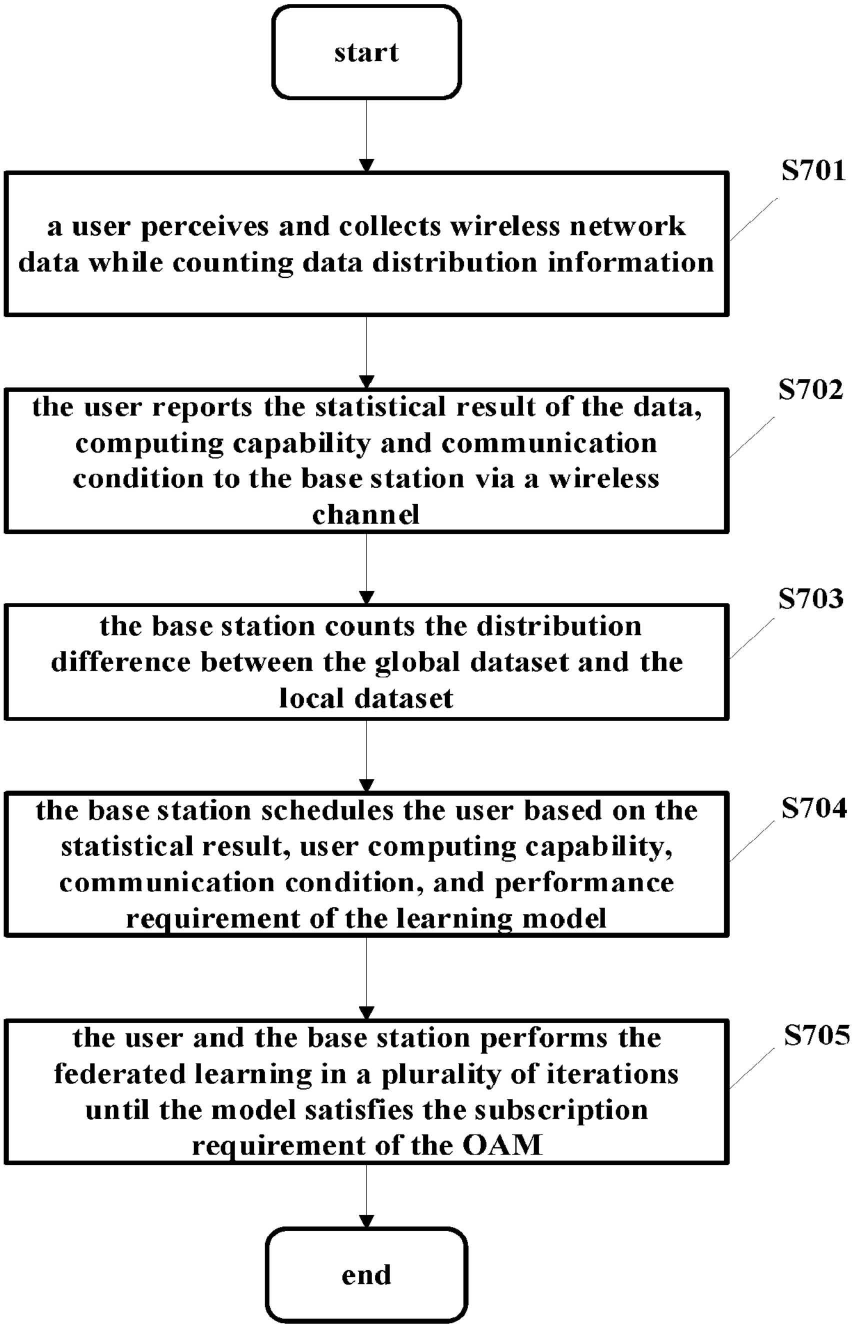
FIG. 7 is a general flowchart of a data processing method illustrated according to an embodiment.

As shown in FIG. 7, a general flowchart of a data processing method of an embodiment of the present disclosure is illustrated.

In the step S701, a UE generates a local dataset by perceiving and collecting wireless network data through the data perception and storage module, and counts the probability distribution information of the local dataset.

In the step S702, the UE reports the statistical result of the local dataset to the base station via a wireless channel, while reporting the computing capability and communication condition.

In the step S703, the base station counts the probability distribution of the global dataset of the network based on the reported statistical result from each UE, and records the probability distribution difference between the local dataset of each UE and the global dataset of the network. The specific steps are shown in the following steps S31~S33.

In the step S31, the UE counts the probability distribution of the local dataset. Taking the local dataset $D_m$ of $UE^m$ as an example, the statistical probability distribution of the local dataset is denoted as $P(X_m)=[P(x_1), P(x_2), \ldots, P(x_n)]$, where $P(x_i)$ represents the probability of $X_m$ taking the event as $x_i$.

In the step S32, the base station counts the distribution of the global dataset of the network based on the statistical result of the probability distribution of the local dataset reported by each UE, with the probability distribution of the global dataset recorded as $P(X_g)=\Sigma P(X_m)$.

In the step S33, the base station calculates and records the probability distribution difference between the local dataset of each UE and the global dataset of the network, and records the probability distribution difference as in $\Delta P_m=\|P(X_g)-P(X_m)\|$.

In the step S704, the base station schedules the UE based on the probability distribution difference between the local dataset of the UE and the global dataset of the network, the computing capability and communication condition of the UE, and the specific performance requirement of the learning model, determines whether the UE will participate in the federated learning, and sends the scheduling result of the UE to the UE.

In the step S705, the UE and the base station performs the federated learning in a plurality of iterations until the model satisfies the subscription requirement of the OAM.

In an embodiment, the UE generates a local training dataset and updates the local learning model by using the local training dataset, and then transmits the training and updating result of the local learning model to the base station via a wireless channel. The base station updates the weight coefficient of each UE in the federated averaging based on whether a handover occurs to the UE and the probability distribution difference between the local dataset of each UE and the global dataset of the network. When a handover occurs to a UE during the training, the UE may directly exit the process of the federated learning, and the base station updates the weight coefficient of the exited UE to zero. The base station performs the federated average learning to obtain an updated result of the global learning model. The base station transmits the updated result of the global learning model to the UE via the wireless channel, and the UE updates the local learning model based on this result. The iteration is repeated according to the process described above until the global learning model satisfies the subscription requirement of the OAM.

Figure 8:
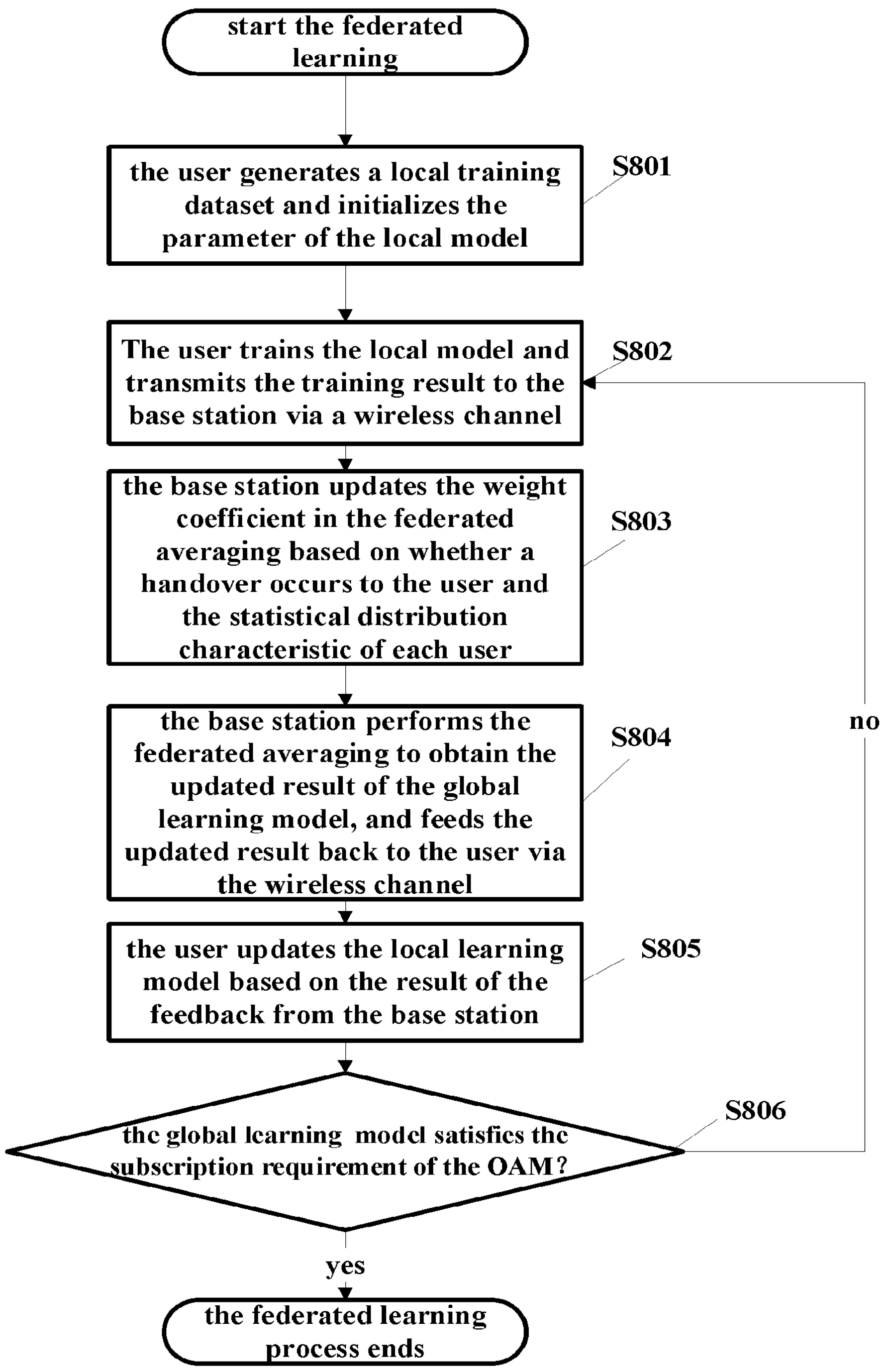
FIG. 8 is a flowchart of federated learning for a user and a base station illustrated according to an embodiment.

Furthermore, as shown in FIG. 8, the process of the federated learning between the UE and the base station includes the following steps S801~S806.

In the step S801, the UE generates a local training dataset and initializes the parameter of the local learning model.

In one embodiment, the UE obtains the local training dataset by randomly and uniformly extracting the local dataset. Taking $UE^m$ as an example, the generated local training dataset is denoted as $D_m$; the UE randomly initializes a set of model parameters as initialized parameters for the local learning model, and the result of the initialized local learning model is recorded as $$w_0^m(0).$$

In the step S802, the UE trains the local learning model and transmits the training result to the base station via a wireless channel.

In one embodiment, the UE first determines the number K of local training rounds based on current available computing capability and real-time communication condition. Next, the UE utilizes the local training dataset to perform K rounds of training and updating on the local learning model. During each training process, the local learning model is trained based on the stochastic gradient descent algorithm. Taking $UE^m$ as an example, the updated result of the model may be expressed as the following formula:

$$w_{t-1}^m(k) = w_{t-1}^m(k-1) - \eta G(w_{t-1}^m(k-1), x(B_{t-1}^m(k))),$$

where $$w_{t-1}^m(k)$$

represents the local learning model obtained after the K-th round of training before the t-th time of the federal averaging is performed, η represents the learning rate, $$B_{t-1}^m(k)$$

represents the training dataset with a data volume of N randomly extracted from the local dataset $D_m$ applied during the K-th round of updating of the local learning model, x represents the data in the training set $$B_{t-1}^m(k),$$

and G(·)represents the empirical risk term.

The UE transmits the training and updating result of the local learning model that has undergone K rounds of training to the base station via a wireless channel. Taking the t-th time of the federal averaging process as an example, the training and updating result of the win local learning model transmitted by each UE may be expressed as $$w_{t-1}^m(K).$$

In the step S803, the base station updates the weight coefficient of each UE in the federated averaging based on whether a handover occurs to the UE and the statistical distribution characteristic of the local dataset of each UE. When a handover occurs to a UE during the training, the UE may directly exit the process of the federated learning, and the base station updates the weight coefficient of the exited UE to zero.

In one embodiment, the weight coefficient of the UE in the federated average learning is calculated based on the probability distribution difference between the local dataset of the UE and the global dataset, which may be expressed as the following formula:

$$a_m = \frac{1/\Delta P_m}{\sum_{m=1}^{M} 1/\Delta P_m}$$

where M represents the total number of the UE participating in the federated learning, am represents the weight of the local learning model of the $UE^m$ in the federated averaging process, and $\Delta P_m$ represents the probability distribution difference between the local dataset of each user and the global dataset.

In the step S804, the base station performs the federated averaging to obtain an updated result of the global learning model, and feeds the updated result back to the user via the wireless channel.

In one embodiment, the base station receives the training and updating result of the local learning model from all users, and obtains the updated result of the global learning model by performing the federated averaging based on the probability distribution difference between the local training dataset of each user and the global dataset of the network. Taking the t-th time of the federated averaging process as an example, the updated result of the global learning model is:

$$w_t = \sum_{m=1}^{M} a_m w_{t-1}^m(K)$$

The base station transmits the updated result of the global learning model to all users via the wireless channel. Taking the t-th time of the federated averaging process as an example, the updated result of the global learning model W sent by the base station is $w_t$, where t is the number of the federated averaging process and K is the total number of the local training rounds performed when the UE reports the model information of the local model.

In the step S805, the user updates the local learning model based on the result of the feedback from the base station.

In one embodiment, the user receives the updated result of the global learning model and updates the local learning model based on the result. Taking the t-th time of the federated averaging process as an example, the updated result of the local learning model of the user m is:

$$w_t^m(0) = w_t.$$

In the step S806, steps S802 to S805 are repeated until the updated global training model satisfies the subscription requirement of the OAM, and as a result, the federated learning process ends, and the final training result $w_T$ of the global learning model is obtained.

The list of analysis IDs in the subscription requirement of the OAM may put forward specific requirement for the model accuracy. After updating the global model in each iteration, the base station compares the training result of the global model with the specific requirement in the list of analysis IDs in the OAM. If the requirement is met, the training will be terminated.

Figure 9:
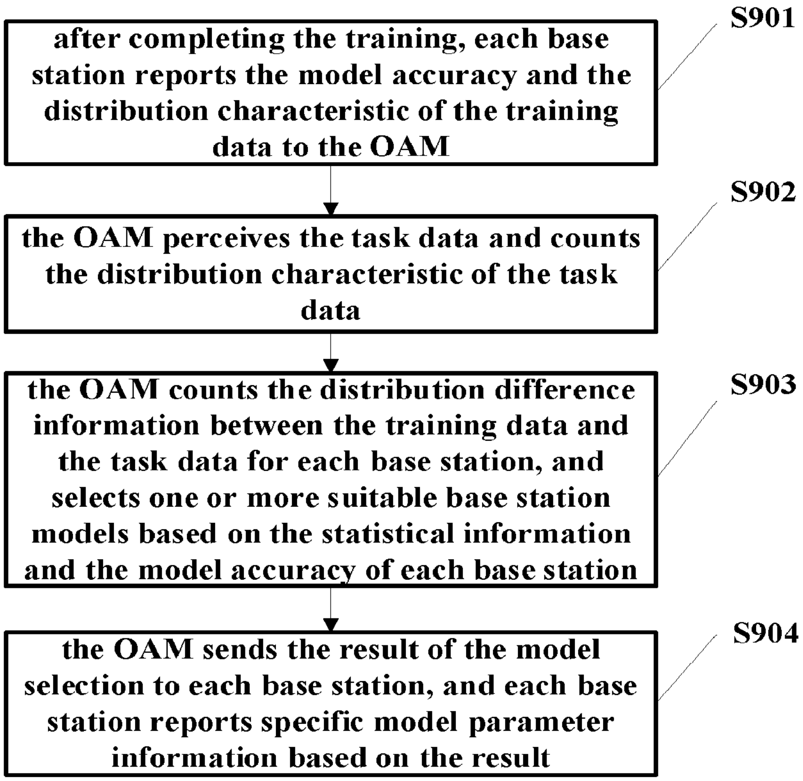
FIG. 9 is a flowchart of a method for model selection in a data processing method illustrated according to an embodiment.

As shown in FIG. 9, the model selection of the network in the data processing method provided by the embodiments of the present disclosure includes the following steps S901-S904.

In the step S901, after completing the training, each base station reports the model accuracy and the distribution characteristic of the training data to the OAM.

In the step S902, the OAM perceives the task data and counts the probability distribution characteristic of the task data.

In the step S903, the OAM counts the distribution difference information between the training data and the task data for each base station, and selects one or more suitable base station models based on the statistical information and the model accuracy of each base station.

In one embodiment, the OAM may select training models from a plurality of base stations and fuse them for use.

In the step S904, the OAM sends the result of the model selection to each base station, and each base station reports specific model parameter information based on the result.

Figure 10:
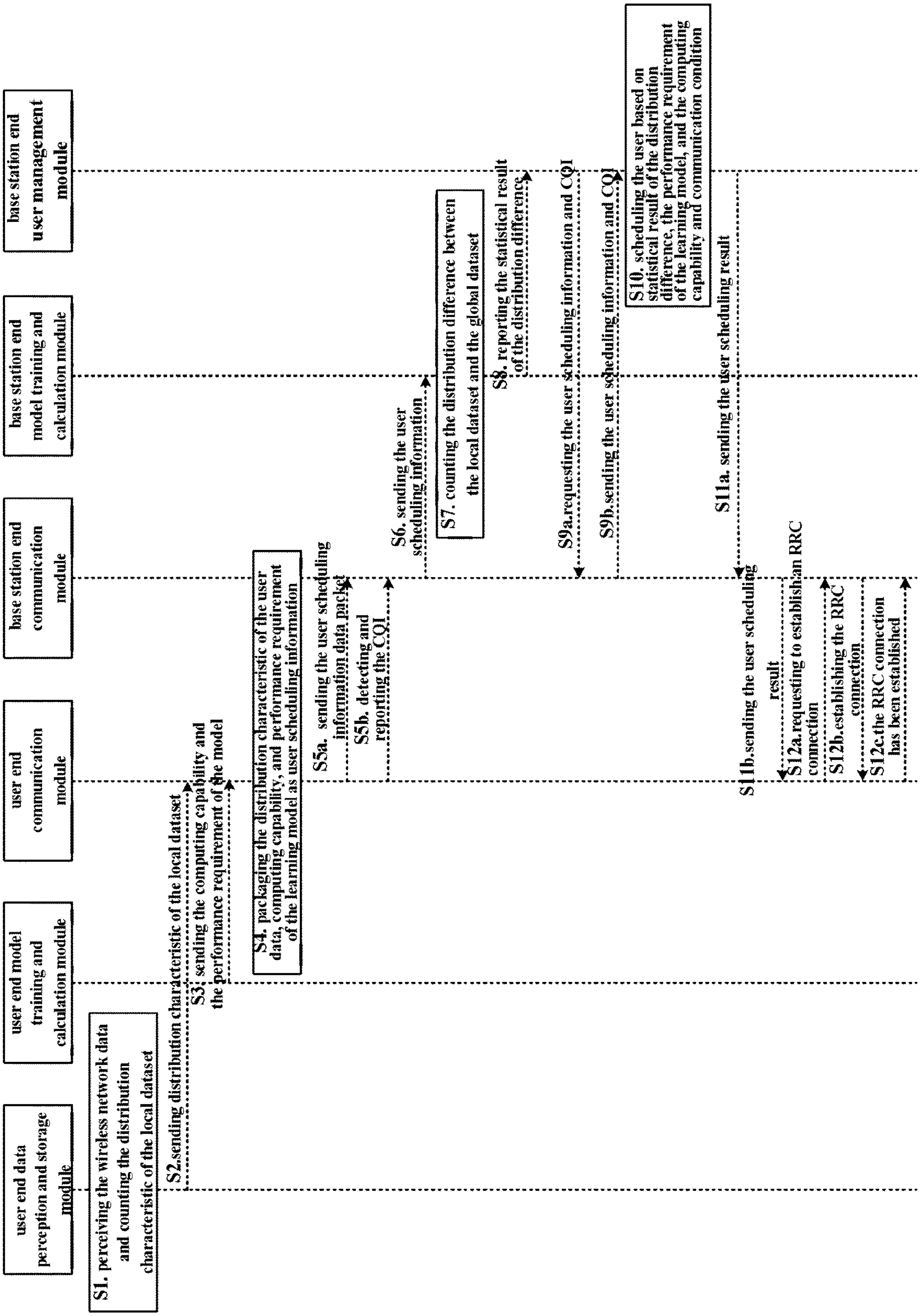
FIG. 10 is a flowchart of a method for user scheduling in a data processing method illustrated according to an embodiment.

As shown in FIG. 10, the protocol and interface principle of the user scheduling part in a data processing method provided by the embodiments of the present disclosure mainly relate to a user end data perception and storage module, a user end model training and calculation module, a user end communication module, a base station end communication module, a base station end model training and calculation module, and a base station end user management module in the wireless federated learning device provided by the embodiments of the present disclosure. Details are as follows.

S1. The user end data perception and storage module perceives the wireless network data, obtains the local dataset, and calculates the distribution characteristic of the local dataset.

S2. The user end data perception and storage module sends the signaling of sending the distribution characteristic information of the local dataset to the user end communication module. This process and corresponding signaling are new to the present disclosure, and the signaling indicates the content of: sending the distribution characteristic information of the local dataset of the user to the receiver.

S3. The user end model training and calculation module sends signaling of sending the computing capability of the user and the performance requirement the learning model to the user end communication module. This process and corresponding signaling are new to the present disclosure, and the signaling indicates the content of: sending the computing capability of the user and the performance requirement of the learning model to the receiver.

S4. The user end communication module packages the distribution characteristic of the user data, computing capability, and performance requirement of the learning model as user scheduling information.

S5*a*. The user end communication module sends the signaling of sending the user scheduling information data packet to the base station end communication module. This process and corresponding signaling are new to the present disclosure, and the signaling indicates the content of: sending the user scheduling information data packet to the receiver.

S5*b*. The user end communication module sends the signaling of detecting the CQI [4] and reporting the detected CQI to the base station end communication module. The signaling indicates the content of: the user detecting the CQI and reporting the CQI information to the receiver.

S6. The base station end communication module sends the signaling of sending the user scheduling information to the base station end model training and calculation module. This process and corresponding signaling are new to the present disclosure, and the signaling indicates the content of: sending the summarized user scheduling information to the receiver. At this point, the data transmitted is unpackaged.

S7. The base station end model training and calculation module counts the distribution difference between the local dataset and the global dataset.

S8. The base station end model training and calculation module sends the signaling of reporting the statistical result of the distribution difference to the base station end user management module. This process and corresponding signaling are new to the present disclosure, and the signaling indicates the content of: reporting the statistical result of the distribution difference to the receiver.

S9*a*. The base station end user management module sends the signaling of requesting the user scheduling information and CQI information to the base station end communication module. This process and corresponding signaling are new to the present disclosure, and the signaling indicates the content of: requesting to summarize the user scheduling information and CQI information.

S9*b*. The base station end communication module sends the signaling of sending the user scheduling information and CQI information to the base station end user management module. This process and corresponding signaling are new to the present disclosure, and the signaling indicates the content of: sending the summarized user scheduling information and CQI information to the receiver.

S10. The base station end user management module schedules the user based on the statistical result of the distribution difference, performance requirement of the learning model, computing capability, and communication condition.

S11*a*. The base station end user management module sends the signaling of sending the user scheduling result to the base station end communication module. This process and corresponding signaling are new to the present disclosure, and the signaling indicates the content of: sending the result of the scheduling scheme for each user to the receiver.

S11*b*. The base station end communication module sends the signaling of sending the user scheduling result to the user end communication module.

S12*a*. The user end communication module sends the signaling of requesting to establish an RRC connection to the target base station communication module. The signaling indicates the content of: requesting to establish the RRC connection with the target base station.

S12*b*. The base station communication module sends the signaling of establishing the RRC connection to the user end communication module. The signaling indicates the content of: notifying the receiver to agree to establish the RRC connection.

S12*c*. The user end communication module sends the signaling of the RRC connection having been established to the target base station communication module. The signaling indicates the content of: notifying the receiver that the RRC connection has been established.

Figure 11:
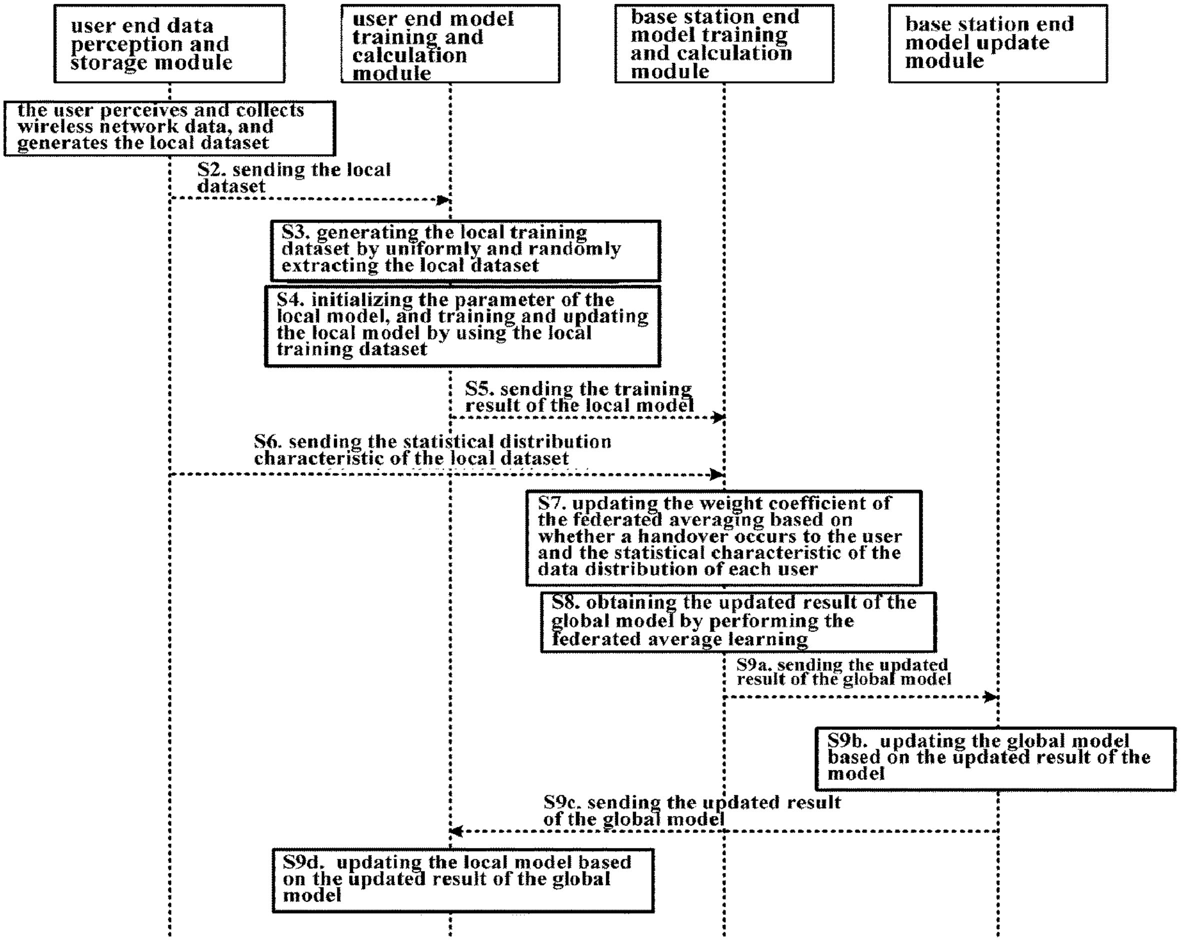
FIG. 11 is a flowchart of a method for federated learning in a data processing method illustrated according to an embodiment.

As shown in FIG. 11, the protocol and interface principle of the federated learning part of the user and the base station in a data processing method provided by the embodiments of the present disclosure mainly relate to a user end data perception and storage module, a user end model training and calculation module, a base station end model training and calculation module, and a base station end model update model in the wireless federated learning device provided by the embodiments of the present disclosure. Details are as follows.

S1. The user end data perception and storage module perceives and collects the wireless network data, and generates the local dataset.

S2. The user end data perception and storage module sends the signaling of sending the local dataset to the user end model training and calculation module. This process and corresponding signaling are new to the present disclosure, and the signaling indicates the content of: sending the local dataset of the user to the receiver.

S3. The user end model training and calculation module generates the local training dataset by uniformly and randomly extracting the local dataset.

S4. The user end model training and calculation module randomly initializes the parameter of the local learning model, and train and update the local learning model by using the local training dataset.

S5. The user end model training and calculation module sends the signaling of sending the training result of the local learning model to the base station end model training and calculation module. This process and corresponding signaling are new to the present disclosure, and the signaling indicates the content of: sending the training result of the local learning model to the receiver.

S6. The user end data perception and storage module sends the signaling of sending the distribution characteristic information of the local dataset to the base station end model training and calculation module.

S7. The base station end model training and calculation module updates the weight coefficient of the federated averaging based on whether a handover occurs to the user and the statistical characteristic of the data distribution of each user.

S8. The base station end model training and calculation module obtaining the updated result of the global learning model by performing the federated average learning.

S9*a*. The base station end model training and calculation module sends the signaling of sending the updated result of the global learning model to the base station end model update module. This process and corresponding signaling are new to the present disclosure. The signaling indicates the content of: sending the updated result of the global learning model to the receiver.

S9*b*. The base station end model update module updates the global learning model based on the updated result of the model.

S9*c*. The base station end model update module sends the signaling of sending the updated result of the global learning model to the user end model training and calculation module.

S9*d*. The user end model training and calculation module updates the local learning model based on the updated result of the global learning model.

Figure 12:
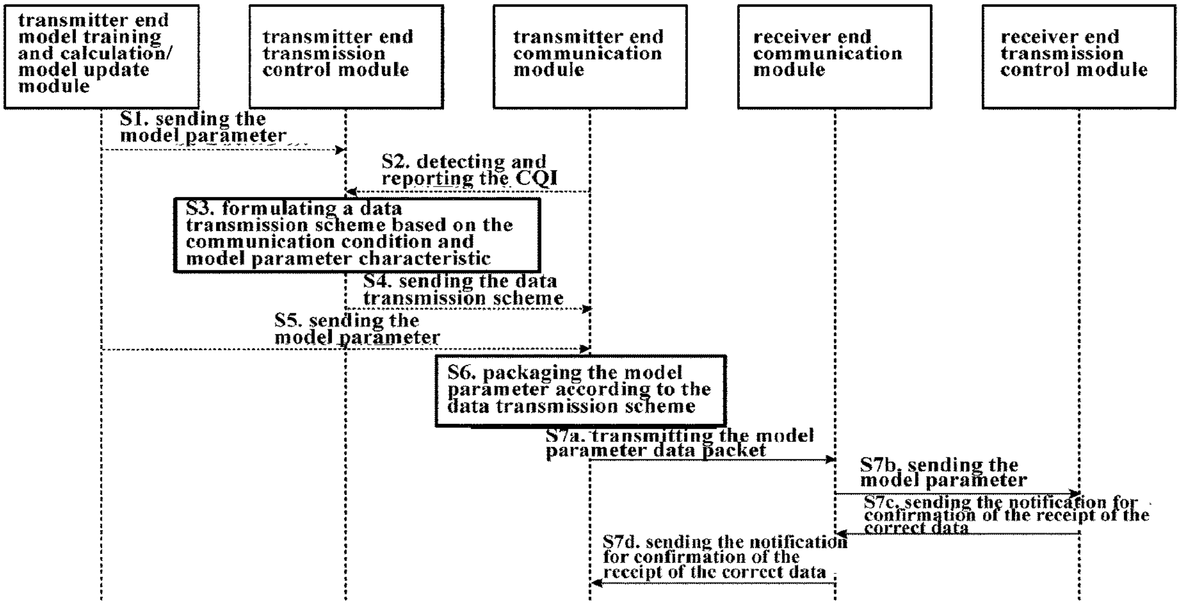
FIG. 12 is a flowchart of a method for data transmission in a data processing method illustrated according to an embodiment.

As shown in FIG. 12, the protocol and interface principle of the data transmission part in a data processing method provided by the embodiments of the present disclosure mainly involve a transmitter end model training and calculation/model update module, a transmitter end transmission control module, a transmitter end communication module, a receiver end communication module, and a receiver end transmission control module. The data transmission involved in the embodiments of the present disclosure may be divided into two cases: firstly, if the user end transmits the updated parameter of the local learning model to the base station end, the transmitter end is the user end, and the receiver end is the base station end; secondly, if the base station end transmits the updated parameter of the global learning model to the user end, the transmitter end is the base station end, and the receiver end is the user end. The following description uses the model parameter to refer to the updated parameter of the local learning model and the updated parameter of the global learning model. Details are as follows.

S1. The transmitter end model training and calculation/model update module sends the signaling of sending the model parameter to the transmission control module. The signaling indicates the content of: sending the updated model parameter to the receiver.

S2. The transmitter end communication module sends the signaling of detecting and reporting the CQI to the transmission control module.

S3. The transmitter end transmission control module formulates a data transmission scheme based on the communication condition and model parameter characteristic.

S4. The transmitter end transmission control module sends the signaling of sending the data transmission scheme information to the transmitter end communication module. This process and corresponding signaling are new to the present disclosure, and the signaling indicates the content of: sending the data transmission scheme information to the receiver, herein, the data transmission scheme information includes the modulation mode, bit rate, and other information.

S5. The transmitter end model training and calculation/model update module sends the signaling of sending the model parameter to the transmitter end communication module.

S6. The transmitter end communication module packages the model parameter according to the data transmission scheme.

S7*a*. The transmitter end communication module sends the signaling of transmitting the model parameter data packet to the receiver end communication module. The signaling indicates the content of: transmitting the packaged model parameter data packet.

S7*b*. The receiver end communication module sends the signaling of sending the model parameter to the receiver end transmission control module. At this point, the data transmitted is unpackaged.

S7*c*. The receiver end transmission control module sends the signaling of notifying the confirmation of the receipt of the correct data to the receiver end communication module, and the signaling indicates the content of: notifying the receiver that the correct data has been received.

S7*d*. The receiver end communication module sends the signaling of notifying the confirmation of the receipt of the correct data to the transmitter end communication module.

Figure 13A:
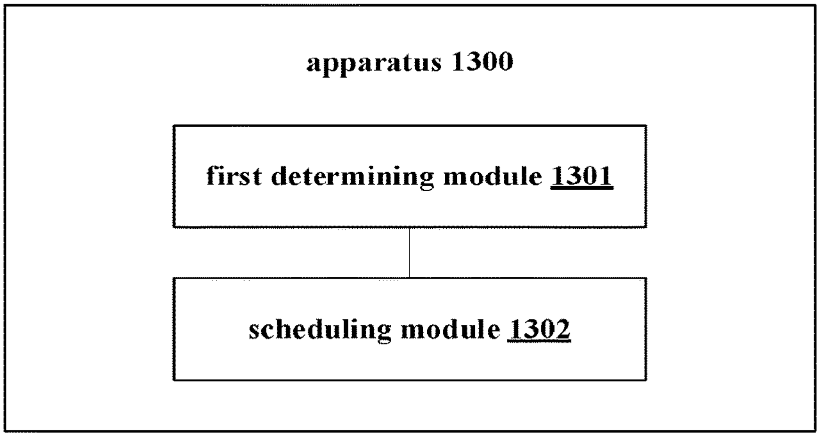
FIG. 13A is a schematic structure diagram of a data processing apparatus illustrated according to an embodiment.

As shown in FIG. 13A, the embodiments of the present disclosure also provide a data processing apparatus 1300. The data processing apparatus 1300 is applied to a base station and includes:

a first determining module 1301, configured to determine a distribution characteristic of a local dataset of at least one user equipment (UE); and a scheduling module 1302, configured to schedule, based on the distribution characteristic of the local dataset, a target UE from the at least one UE for participating in federated learning.

In Some Embodiments, the Scheduling Module Includes:

a first obtaining sub-module, configured to obtain statistical information of a distribution difference between the local dataset and a global dataset for each of the at least one UE; and a first scheduling sub-module, configured to schedule, based on the statistical information of the distribution difference, the target UE from the at least one UE for participating in the federated learning.

In Some Embodiments, the Apparatus Further Includes:

a first obtaining module, configured to obtain capability information of the at least one UE.

In these Embodiments, the Scheduling Module Includes:

a second scheduling sub-module, configured to schedule, based on the distribution characteristic of the local dataset and the capability information of the at least one UE, the target UE from the at least one UE for participating in the federated learning.

In some embodiments, the capability information of the at least one UE includes at least one of:

computing capability information, indicating computing capability of the UE; or communication status information, indicating communication capability and/or a communication channel status of the UE.

In some embodiments, the communication status information includes: channel quality indication (CQI) information detected by the UE.

In Some Embodiments, the Apparatus Further Includes:

a second determining module, configured to determine, based on statistical information of a distribution difference between the local dataset of the target UE and a global dataset of the base station, a weight coefficient of the target UE in the federated learning.

In some embodiments, the statistical information of the distribution difference includes: a probability distribution difference.

The Second Determining Module Includes:

a first determining sub-module, configured to determine the weight coefficient of the target UE based on the probability distribution difference corresponding to a single target UE and a sum of probability distribution differences of all the target UE performing a same federated learning.

In Some Embodiments, the Apparatus Further Includes:

a first receiving module, configured to receive model information of a local model reported by the target UE for performing the federated learning; and a processing module, configured to obtain a global learning model by performing, based on the model information of the local model and the weight coefficient of the target UE, weighted averaging on the local model of a plurality of the target UE.

In Some Embodiments, the Apparatus Further Includes:

a first terminating module, configured to terminate, in response to the global learning model satisfying a subscription requirement of operation administration and maintenance (OAM), reception of the model information of the local model reported by the target UE for performing the federated learning.

In Some Embodiments, the Apparatus Further Includes:

a first sending module, configured to send model information of the global learning model to the target UE in response to the global learning model not satisfying the subscription requirement of the OAM;

a second receiving module, configured to receive model information of an updated local model updated by the target UE based on the global learning model; and a first updating module, configured to update the global learning model based on the updated local model and a weight coefficient corresponding to the updated local model of the target UE.

In Some Embodiments, the Apparatus Further Includes:

a first reporting model, configured to report model information of the global learning model and training data for training the global learning model to OAM;

a third receiving model, configured to receive a model parameter determined by the OAM based on the model information of the global learning model, the training data and task data of the OAM;

a second updating model, configured to update the global learning model based on the model parameter.

In Some Embodiments, the Apparatus Further Includes:

a third determining module, configured to determine, in response to detecting a handover occurs to the target UE connected to the base station, that the target UE exits the federated learning.

The embodiments of the present disclosure also provide a data processing apparatus. The data processing apparatus is applied to a base station and includes:

a second obtaining module, configured to obtain statistical information of a distribution difference between the local dataset and a global dataset for each of the at least one UE; and a second scheduling module, configured to schedule, based on the statistical information of the distribution difference, the target UE from the at least one UE for participating in the federated learning.

Figure 13B:
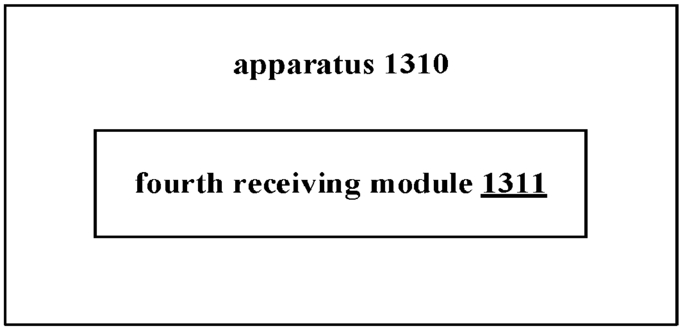
FIG. 13B is another schematic structure diagram of a data processing apparatus illustrated according to an embodiment.

As shown in FIG. 13B, the embodiments of the present disclosure also provide a data processing apparatus 1310. The data processing apparatus 1310 is applied to a user equipment (UE) and includes:

a fourth receiving module 1311, configured to receive scheduling information sent by a base station based on a distribution characteristic of a local dataset of the UE, herein, the scheduling information is used for determining whether the UE is the target UE being scheduled for participating in the federated learning.

In Some Embodiments, the Fourth Receiving Module is Specifically Configured to:

receive the scheduling information sent by the base station based on statistical information of a distribution difference obtained according to the distribution characteristic of the local dataset of the UE and a distribution characteristic of a global dataset.

In Some Embodiments, the Apparatus Further Includes:

a second reporting module, configured to report capability information, herein, the capability information is used for the base station to send the scheduling information based on the distribution characteristic of the local dataset and the capability information.

In Some Embodiments, the Capability Information Includes at Least One of:

computing capability information, indicating computing capability of the UE; or communication status information, indicating communication capability and/or a communication channel status of the UE.

In some embodiments, the communication status information includes channel quality indication (CQI) information; and the apparatus further includes:

a detecting module, configured to detect the CQI information of a channel between the UE and the base station.

In Some Embodiments, the Apparatus Further Includes:

a third reporting model, configured to report model information of a local model of the UE, herein, the local model is used for the base station to perform the federated learning based on the local model and a weight coefficient of the UE, and the weight coefficient of the UE is determined by the base station based on statistical information of a distribution difference between the local dataset of the UE and a global dataset of the base station.

In Some Embodiments, the Apparatus Further Includes:

a first generating module, configured to generate the local dataset based on collected wireless network data;

a second generating module, configured to generate a local training dataset by extracting data from the local dataset; and a training module, configured to obtain the local model by performing model training using the local training dataset.

In Some Embodiments, the Apparatus Further Includes:

a fifth receiving module, configured to receive model information of a global learning model sent by the base station;

a third updating module, configured to obtain an updated local model by performing the federated learning based on the model information of the global learning model; and a fourth reporting model, configured to report model information of the updated local model in response to the global learning model not satisfying a subscription requirement of operation administration and maintenance (OAM).

In Some Embodiments, the Apparatus Further Includes:

a second terminating module, configured to terminate the federated learning in response to the global learning model satisfying the subscription requirement of the OAM.

In Some Embodiments, the Apparatus Further Includes:

a third terminating module, configured to terminate the federated learning in response to detecting a handover occurs to the UE connected to the base station.

The embodiments of the present disclosure also provide a data processing apparatus. The data processing apparatus is applied to a UE and includes:

a fifth reporting model, configured to report a distribution characteristic of a local dataset, herein, the distribution characteristic of the local dataset is used for the base station to determine whether to schedule the UE for participating in the federated learning.

With respect to the apparatus in the embodiments described above, the specific manner in which the individual modules perform their operations has been described in detail in the embodiments relating to the method and will not be described in detail herein.

Figure 14:
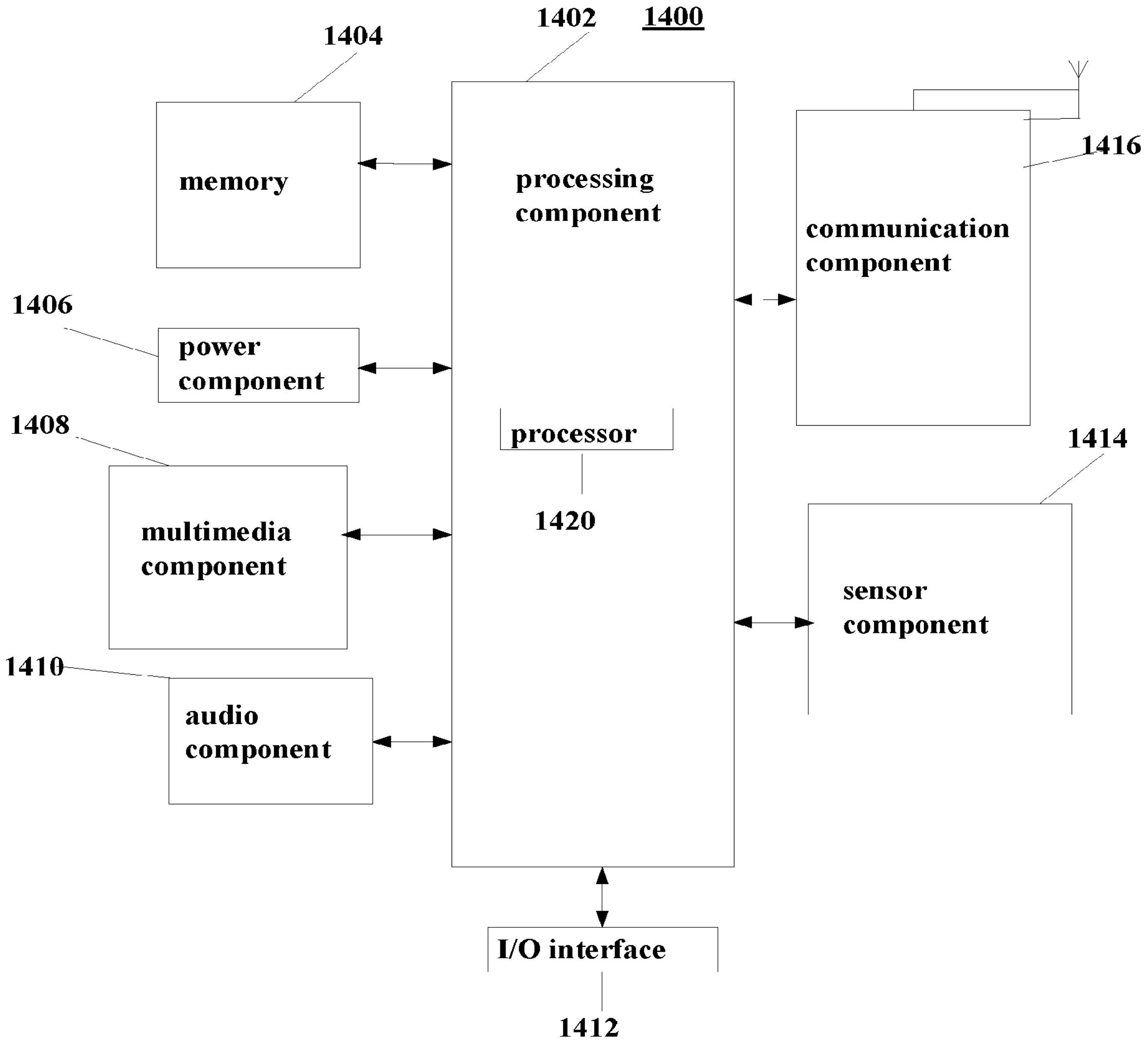
FIG. 14 is a schematic structure diagram of a communication device illustrated according to an embodiment.

FIG. 14 is a structure block diagram of a communication device provided by an embodiment of the present disclosure. The communication device may be a terminal. For example, the communication device 1400 may be a cell phone, a computer, a digital broadcast subscriber device, a message sending and receiving device, a game console, a tablet device, a medical device, a fitness device, a personal digital assistant, and the like.

Referring to FIG. 14, the communication device 1400 may include at least one of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls the overall operation of the communication device 1400, such as operations associated with display, phone call, data communication, camera operations, and recording operations. The processing component 1402 may include at least one processor 1420 to execute instructions to complete all or a portion of the steps of the method described above. In addition, the processing component 1402 may include at least one module that facilitates interaction between the processing component 1402 and other components. For example, the processing component 1402 may include a multimedia module to facilitate the interaction between the multimedia component 1408 and the processing component 1402.

The memory 1404 is configured to store various types of data to support the operation at the communication device 1400. Examples of such data include the following for any application or method to operate on the communication device 1400: instructions, contact data, phonebook data, messages, pictures, videos, etc. The memory 1404 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or a CD-ROM.

The power component 1406 provides power to the various components of the communication device 1400. The power component 1406 may include a power management system, at least one power supply, and other components associated with generating, managing, and distributing power for the communication device 1400.

The multimedia component 1408 includes a screen that provides an output interface between the communication device 1400 and a user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, swipes, and gestures on the touch panel. The touch sensors may not only sense the boundaries of the touch or swipe action, but also detect the wake-up time and pressure associated with the touch or swipe action. In some embodiments, multimedia component 1408 includes a front-facing camera and/or a rear-facing camera. The front-facing camera and/or rear-facing camera may receive external multimedia data when the communication device 1400 is in an operating mode, such as a shooting mode or video mode. Each front-facing camera and rear-facing camera may be a fixed optical lens system or have focal length and optical zoom capability.

The audio component 1410 is configured to output and/or input audio signals. For example, the audio component 1410 includes a microphone (MIC) configured to receive external audio signals when the communication device 1400 is in an operating mode, such as a call mode, a recording mode, and a voice recognition mode. The received audio signal may be further stored in the memory 1404 or sent via communication component 1416. In some embodiments, the audio component 1410 further includes a speaker for outputting audio signals.

The I/O interface 1412 provides an interface between the processing component 1402 and a peripheral interface module, the peripheral interface module may be a keypad, a click wheel, a button, etc. These buttons may include, but are not limited to: a home button, a volume button, a start button, and a lock button.

The sensor component 1414 includes at least one sensor, used for providing a status assessment of various aspects of the communication device 1400. For example, the sensor component 1414 may detect an open/closed state of the device 1400, relative positioning of components, for example, the components is the display and keypad of the communication device 1400, the sensor component 1414 may also detect a change in the position of the communication device 1400 or a change in the position of one component of the communication device 1400, the presence or absence of user contact with the communication device 1400, the orientation or acceleration/deceleration of the communication device 1400, and a temperature change of the communication device 1400. The sensor component 1414 may include a proximity sensor configured to detect the presence of a nearby object in the absence of any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication between the communication device 1400 and other devices by wired or wireless means. The communication device 1400 may access a wireless network based on a communication standard, such as WiFi, 2G or 3G, or a combination thereof. In one embodiment, the communication component 1416 receives broadcast signals or broadcast-related information from an external broadcast management system via a broadcast channel. In one embodiment, the communication component 1416 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In one embodiment, the communication device 1400 may be implemented by at least one application-specific integrated circuit (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method described above.

In one embodiment, a non-transitory computer-readable storage medium including instructions is provided, such as a memory 1404 including instructions, the above instructions being executable by the processor 1420 of the communication device 1400 to accomplish the method described above. For example, the non-transitory computer-readable storage medium may be ROM, random access memory (RAM), CD-ROM, magnetic tape, floppy disk, and optical data storage device, etc.

Figure 15:
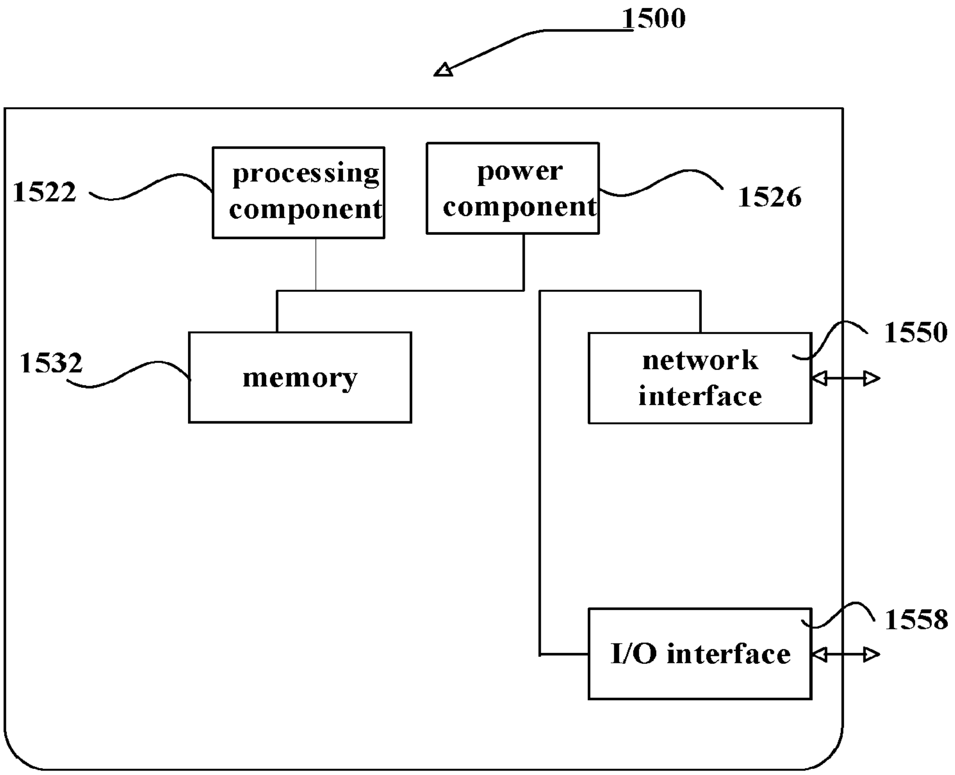
FIG. 15 is another schematic structure diagram of a communication device illustrated according to an embodiment.

As shown in FIG. 15, the embodiments of the present disclosure show the structure of another communication device. The communication device may be a base station as covered by the embodiments of the present disclosure. For example, the communication device 1500 may be provided as a network device. Referring to FIG. 15, the communication device 1500 includes a processing component 1522. The processing component 1522 further includes at least one processor, and a memory resource represented by the memory 1532 used for storing instructions, such as an application program, executable by the processing component 1522. The application programs stored in the memory 1532 may include one or more modules each corresponding to a set of instructions. In addition, the processing component 1522 is configured to execute the instructions to implement any of the methods described above applied to the communication device.

The communication device 1500 may also include: a power component 1526, configured to execute power management of the communication device 1500; a wired or wireless network interface 1550, configured to connect the communication device 1500 to a network; and an input-output (I/O) interface 1558. The communication device 1500 may operate an operating system based on an operating system stored in the memory 1532, such as Windows Server™, Mac OS X™, Unix™, Linux™, FreeBSD™ or the like.

According to the first embodiment of the present disclosure, a data processing method is provided. The data processing method is applied to a base station and includes:

determining a distribution characteristic of a local dataset of at least one user equipment (UE); and scheduling, based on the distribution characteristic of the local dataset, a target UE from the at least one UE for participating in federated learning.

In some embodiments, the scheduling, based on the distribution characteristic of the local dataset, the target UE from the at least one UE for participating in the federated learning includes:

obtaining statistical information of a distribution difference between the local dataset and a global dataset for each of the at least one UE; and scheduling, based on the statistical information of the distribution difference, the target UE from the at least one UE for participating in the federated learning.

In Some Embodiments, the Method Further Includes:

obtaining capability information of the at least one UE; wherein the scheduling, based on the distribution characteristic of the local dataset, the target UE from the at least one UE for participating in the federated learning includes:

scheduling, based on the distribution characteristic of the local dataset and the capability information of the at least one UE, the target UE from the at least one UE for participating in the federated learning.

In Some Embodiments, the Capability Information of the at Least One UE Includes at Least One of:

computing capability information, indicating computing capability of the UE; or communication status information, indicating communication capability and/or a communication channel status of the UE.

In some embodiments, the communication status information includes: channel quality indication (CQI) information detected by the UE.

In some embodiments, the method further includes: determining, based on statistical information of a distribution difference between the local dataset of the target UE and a global dataset of the base station, a weight coefficient of the target UE in the federated learning.

In some embodiments, the statistical information of the distribution difference includes: a probability distribution difference; and the determining, based on the statistical information of the distribution difference between the local dataset of the target UE and the global dataset of the base station, the weight coefficient of the target UE in the federated learning includes:

determining the weight coefficient of the target UE based on the probability distribution difference corresponding to a single target UE and a sum of probability distribution differences of all the target UE performing a same federated learning.

In Some Embodiments, the Method Further Includes:

receiving model information of a local model reported by the target UE for performing the federated learning; and obtaining a global learning model by performing, based on the model information of the local model and the weight coefficient of the target UE, weighted averaging on the local model of a plurality of the target UE.

In Some Embodiments, the Method Further Includes:

terminating, in response to the global learning model satisfying a subscription requirement of operation administration and maintenance (OAM), reception of the model information of the local model reported by the target UE for performing the federated learning.

In Some Embodiments, the Method Further Includes:

sending model information of the global learning model to the target UE in response to the global learning model not satisfying the subscription requirement of the OAM;

receiving model information of an updated local model updated by the target UE based on the global learning model; and updating the global learning model based on the updated local model and a weight coefficient corresponding to the updated local model of the target UE.

In Some Embodiments, the Method Further Includes:

reporting model information of the global learning model and training data for training the global learning model to OAM;

receiving a model parameter determined by the OAM based on the model information of the global learning model, the training data and task data of the OAM; and updating the global learning model based on the model parameter.

In Some Embodiments, the Method Further Includes:

determining, in response to detecting a handover occurs to the target UE connected to the base station, that the target UE exits the federated learning.

According to the second embodiment of the present disclosure, a data processing method is provided. The data processing method is applied to a user equipment (UE) and includes:

receiving scheduling information, wherein the scheduling information is sent by a base station based on a distribution characteristic of a local dataset of the UE for scheduling federated learning.

In some embodiments, the receiving the scheduling information sent by the base station based on the distribution characteristic of the local dataset of the UE includes:

receiving the scheduling information sent by the base station based on statistical information of a distribution difference obtained according to the distribution characteristic of the local dataset of the UE and a distribution characteristic of a global dataset.

In Some Embodiments, the Method Further Includes:

reporting capability information, wherein the capability information is used for the base station to send the scheduling information based on the distribution characteristic of the local dataset and the capability information.

In Some Embodiments, the Capability Information Includes at Least One of:

computing capability information, indicating computing capability of the UE; or communication status information, indicating communication capability and/or a communication channel status of the UE.

In some embodiments, the communication status information includes channel quality indication (CQI) information; and the method further includes:

detecting the CQI information of a channel between the UE and the base station.

In Some Embodiments, the Method Further Includes:

reporting model information of a local model of the UE, wherein the local model is used for the base station to perform the federated learning based on the local model and a weight coefficient of the UE, and the weight coefficient of the UE is determined by the base station based on statistical information of a distribution difference between the local dataset of the UE and a global dataset of the base station.

In Some Embodiments, the Method Further Includes:

generating the local dataset based on collected wireless network data;

generating a local training dataset by extracting data from the local dataset; and obtaining the local model by performing model training using the local training dataset.

In Some Embodiments, the Method Further Includes:

receiving model information of a global learning model sent by the base station;

obtaining an updated local model by performing the federated learning based on the model information of the global learning model; and reporting model information of the updated local model in response to the global learning model not satisfying a subscription requirement of operation administration and maintenance (OAM).

In Some Embodiments, the Method Further Includes:

terminating the federated learning in response to the global learning model satisfying the subscription requirement of the OAM.

In Some Embodiments, the Method Further Includes:

terminating the federated learning in response to detecting a handover occurs to the UE connected to the base station.

According to the third embodiment of the present disclosure, a data processing apparatus is provided. The data processing apparatus is applied to a base station and includes:

a first determining module, configured to determine a distribution characteristic of a local dataset of at least one user equipment (UE); and a scheduling module, configured to schedule, based on the distribution characteristic of the local dataset, a target UE from the at least one UE for participating in federated learning.

In Some Embodiments, the Scheduling Module Includes:

a first obtaining sub-module, configured to obtain statistical information of a distribution difference between the local dataset and a global dataset for each of the at least one UE; and a first scheduling sub-module, configured to schedule, based on the statistical information of the distribution difference, the target UE from the at least one UE for participating in the federated learning.

In Some Embodiments, the Apparatus Further Includes:

a first obtaining module, configured to obtain capability information of the at least one UE; wherein the scheduling module includes:

a second scheduling sub-module, configured to schedule, based on the distribution characteristic of the local dataset and the capability information of the at least one UE, the target UE from the at least one UE for participating in the federated learning.

In Some Embodiments, the Capability Information of the at Least One UE Includes at Least One of:

computing capability information, indicating computing capability of the UE; or communication status information, indicating communication capability and/or a communication channel status of the UE.

In some embodiments, the communication status information includes: channel quality indication (CQI) information detected by the UE.

In Some Embodiments, the Apparatus Further Includes:

a second determining module, configured to determine, based on statistical information of a distribution difference between the local dataset of the target UE and a global dataset of the base station, a weight coefficient of the target UE in the federated learning.

In some embodiments, the statistical information of the distribution difference includes: a probability distribution difference; and the second determining module includes:

a first determining sub-module, configured to determine the weight coefficient of the target UE based on the probability distribution difference corresponding to a single target UE and a sum of probability distribution differences of all the target UE performing a same federated learning.

In Some Embodiments, the Apparatus Further Includes:

a first receiving module, configured to receive model information of a local model reported by the target UE for performing the federated learning; and a processing module, configured to obtain a global learning model by performing, based on the model information of the local model and the weight coefficient of the target UE, weighted averaging on the local model of a plurality of the target UE.

In Some Embodiments, the Apparatus Further Includes:

a first terminating module, configured to terminate, in response to the global learning model satisfying a subscription requirement of operation administration and maintenance (OAM), reception of the model information of the local model reported by the target UE for performing the federated learning.

In Some Embodiments, the Apparatus Further Includes:

a first sending module, configured to send model information of the global learning model to the target UE in response to the global learning model not satisfying the subscription requirement of the OAM;

a second receiving module, configured to receive model information of an updated local model updated by the target UE based on the global learning model; and a first updating module, configured to update the global learning model based on the updated local model and a weight coefficient corresponding to the updated local model of the target UE.

In Some Embodiments, the Apparatus Further Includes:

a first reporting model, configured to report model information of the global learning model and training data for training the global learning model to OAM;

a third receiving model, configured to receive a model parameter determined by the OAM based on the model information of the global learning model, the training data and task data of the OAM; and a second updating model, configured to update the global learning model based on the model parameter.

In Some Embodiments, the Apparatus Further Includes:

a third determining module, configured to determine, in response to detecting a handover occurs to the target UE connected to the base station, that the target UE exits the federated learning.

According to the fourth embodiment of the present disclosure, a data processing apparatus is provided. The data processing apparatus is applied to a user equipment (UE) and includes:

a fourth receiving module, configured to receive scheduling information, wherein the scheduling information is sent by a base station based on a distribution characteristic of a local dataset of the UE for scheduling federated learning.

In Some Embodiments, the Fourth Receiving Module is Specifically Configured to:

receive the scheduling information sent by the base station based on statistical information of a distribution difference obtained according to the distribution characteristic of the local dataset of the UE and a distribution characteristic of a global dataset.

In Some Embodiments, the Apparatus Further Includes:

a second reporting module, configured to report capability information, wherein the capability information is used for the base station to send the scheduling information based on the distribution characteristic of the local dataset and the capability information.

In Some Embodiments, the Capability Information Includes at Least One of:

computing capability information, indicating computing capability of the UE; or communication status information, indicating communication capability and/or a communication channel status of the UE.

In some embodiments, the communication status information includes channel quality indication (CQI) information; and the apparatus further includes:

a detecting module, configured to detect the CQI information of a channel between the UE and the base station.

In Some Embodiments, the Apparatus Further Includes:

a third reporting model, configured to report model information of a local model of the UE, wherein the local model is used for the base station to perform the federated learning based on the local model and a weight coefficient of the UE, and the weight coefficient of the UE is determined by the base station based on statistical information of a distribution difference between the local dataset of the UE and a global dataset of the base station.

In Some Embodiments, the Apparatus Further Includes:

a first generating module, configured to generate the local dataset based on collected wireless network data;

a second generating module, configured to generate a local training dataset by extracting data from the local dataset; and a training module, configured to obtain the local model by performing model training using the local training dataset.

In Some Embodiments, the Apparatus Further Includes:

a fifth receiving module, configured to receive model information of a global learning model sent by the base station;

a third updating module, configured to obtain an updated local model by performing the federated learning based on the model information of the global learning model; and a fourth reporting model, configured to report model information of the updated local model in response to the global learning model not satisfying a subscription requirement of operation administration and maintenance (OAM).

In Some Embodiments, the Apparatus Further Includes:

a second terminating module, configured to terminate the federated learning in response to the global learning model satisfying the subscription requirement of the OAM.

In Some Embodiments, the Apparatus Further Includes:

a third terminating module, configured to terminate the federated learning in response to detecting a handover occurs to the UE connected to the base station.

According to the fifth embodiment of the present disclosure, a communication device is provided. The communication device at least includes a processor and a memory used for storing executable instructions capable of running on the processor, wherein when the processor is used for running the executable instructions, the executable instructions execute steps in any one of the methods for determining the processing time described above.

According to the sixth embodiment of the present disclosure, a non-temporary computer-readable storage medium is provided. The computer-readable storage medium stores computer-executable instructions, the computer-executable instructions, when executed by a processor, implement steps in any one of the methods for determining the processing time described above.

In the embodiments of the present disclosure, the base station can utilize the distribution characteristic of the local dataset of the UE to schedule the UE that can participate in the federated learning from a plurality of candidate UE that have established communication connections with the base station, and jointly perform the federated learning with the UE participating in the federated learning. In this way, direct scheduling of the base station can be achieved without the need for the UE to report data to the core network or data center, greatly improving training efficiency.

Other embodiments of the present disclosure will readily come to the mind of those skilled in the art upon consideration of the specification and practice of the disclosure disclosed herein. The present disclosure is intended to cover any variation, use, or adaptation of the present disclosure that follows the general principles of the present disclosure and includes commonly known or customary technical means in the art that are not disclosed herein. The specification and embodiments are considered as examples only and the true scope and spirit of the present disclosure is indicated by the following claims.

It should be understood that the present disclosure is not limited to the precise structure already described above and illustrated in the accompanying drawings, and that various modifications and changes may be made without departing from the scope of the present disclosure. The scope of the present disclosure is limited only by the appended claims.

What is claimed is:

1. A data processing method, comprising:

determining, by a base station, a distribution characteristic of a local dataset of at least one user equipment (UE);

scheduling, by the base station, based on the distribution characteristic, a target UE from the at least one UE for participating in federated learning; and determining, based on statistical information of a distribution difference between the local dataset of the target UE and a global dataset of the base station, a weight coefficient of the target UE in the federated learning, wherein the global dataset is at least determined by the base station based on local datasets of a plurality of candidate UEs in the at least one UE associated with the base station, wherein the statistical information of the distribution difference comprises: a probability distribution difference, and the determining the weight coefficient of the target UE in the federated learning comprises:

determining the weight coefficient of the target UE based on a ratio of the probability distribution difference corresponding to the target UE to a sum of probability distribution differences corresponding to all UEs performing the federated learning.

2. The method according to claim 1, wherein the scheduling the target UE from the at least one UE for participating in the federated learning comprises:

obtaining statistical information of a distribution difference between the local dataset and a global dataset for the at least one UE; and scheduling, based on the statistical information of the distribution difference, the target UE from the at least one UE for participating in the federated learning.

3. The method according to claim 1, further comprising:

obtaining capability information of the at least one UE; wherein the scheduling the target UE from the at least one UE for participating in the federated learning comprises:

scheduling, based on the distribution characteristic and the capability information, the target UE from the at least one UE for participating in the federated learning.

4. The method according to claim 3, wherein the capability information of the at least one UE comprises at least one of:

computing capability information, indicating computing capability of the UE; or communication status information, indicating at least one of a communication capability or a communication channel status of the UE.

5. The method according to claim 4, wherein the communication status information comprises: channel quality indication (CQI) information detected by the UE.

6. The method according to claim 1, further comprising:

receiving model information of a local model reported by the target UE for performing the federated learning; and obtaining a global learning model by performing, based on the model information of the local model and the weight coefficient of the target UE, weighted averaging on the local model all UE performing the federated learning.

7. The method according to claim 6, further comprising:

terminating, in response to the global learning model satisfying a subscription requirement of operation administration and maintenance (OAM), reception of the model information.

8. The method according to claim 7, further comprising:

sending model information of the global learning model to the target UE in response to the global learning model not satisfying the subscription requirement of the OAM;

receiving model information of an updated local model updated by the target UE based on the global learning model; and updating the global learning model based on the updated local model and the weight coefficient corresponding to the updated local model of the target UE.

9. The method according to claim 1, further comprising:

reporting model information of the global learning model and training data for training the global learning model to OAM;

receiving a model parameter determined by the OAM based on the model information of the global learning model, the training data and task data of the OAM; and updating the global learning model based on the model parameter.

10. The method according to claim 1, further comprising:

determining, in response to detecting a handover occurs to the target UE connected to the base station, that the target UE exits the federated learning.

11. A data processing method comprising:

receiving, by a user equipment (UE), scheduling information, wherein the scheduling information is sent by a base station based on a distribution characteristic of a local dataset of the UE for scheduling federated learning, wherein the local dataset of the UE is used for the base station to determine, based on statistical information of a distribution difference between the local dataset of the UE and a global dataset of the base station, a weight coefficient of the UE in the federated learning, and the global dataset is at least determined by the base station based on local datasets of a plurality of candidate UEs in at least one UE associated with the base station, wherein the statistical information of the distribution difference comprises: a probability distribution difference, and the local dataset of the UE is used for the base station to determine the weight coefficient of the UE based on a ratio of the probability distribution difference corresponding to the UE to a sum of probability distribution differences corresponding to all UEs performing the federated learning.

12. The method according to claim 11, further comprising:

reporting capability information; and receiving the scheduling information sent by the base station based on the distribution characteristic of the local dataset and the capability information.

13. The method according to claim 12, wherein the capability information comprises at least one of:

computing capability information, indicating computing capability of the UE; or communication status information, indicating at least one of a communication capability or a communication channel status of the UE.

14. The method according to claim 13, wherein the communication status information comprises channel quality indication (CQI) information; and the method further comprises:

detecting the CQI information of a channel between the UE and the base station.

15. The method according to claim 11, further comprising:

reporting model information of a local model of the UE, wherein the local model is used for the base station to perform the federated learning based on the local model and the weight coefficient of the UE.

16. The method according to claim 15, further comprising:

generating the local dataset based on collected wireless network data;

generating a local training dataset by extracting data from the local dataset; and obtaining the local model by performing model training using the local training dataset.

17. The method according to claim 15, further comprising:

receiving model information of a global learning model sent by the base station;

obtaining an updated local model by performing the federated learning based on the model information of the global learning model; and reporting model information of the updated local model in response to the global learning model not satisfying a subscription requirement of operation administration and maintenance (OAM).

18. A communication device, wherein the communication device at least comprises a processor and a memory used for storing executable instructions capable of running on the processor, wherein the processor, through running the executable instructions, is configured to:

determine a distribution characteristic of a local dataset of at least one user equipment (UE);

schedule, based on the distribution characteristic, a target UE from the at least one UE for participating in federated learning; and determine, based on statistical information of a distribution difference between the local dataset of the target UE and a global dataset of a base station, a weight coefficient of the target UE in the federated learning, wherein the global dataset is at least determined by the base station based on local datasets of a plurality of candidate UEs in the at least one UE associated with the base station, wherein the statistical information of the distribution difference comprises a probability distribution difference, and the processor is configured to determine the weight coefficient of the target UE based on a ratio of the probability distribution difference corresponding to the target UE to a sum of probability distribution differences corresponding to all UEs performing the federated learning; or the processor, through running the executable instructions, is configured to:

receive scheduling information, wherein the scheduling information is sent by a base station based on a distribution characteristic of a local dataset of a UE for scheduling federated learning, wherein the local dataset of the UE is used for the base station to determine, based on statistical information of a distribution difference between the local dataset of the UE and a global dataset of the base station, a weight coefficient of the UE in the federated learning, and the global dataset is at least determined by the base station based on local datasets of a plurality of candidate UEs in at least one UE associated with the base station, wherein the statistical information of the distribution difference comprises a probability distribution difference, and the local dataset of the UE is used for the base station to determine the weight coefficient of the UE based on a ratio of the probability distribution difference corresponding to the UE to a sum of probability distribution differences corresponding to all UEs performing the federated learning.

* * * * *